United States Patent
Hu et al.

(10) Patent No.: US 10,419,437 B2
(45) Date of Patent: Sep. 17, 2019

(54) QUASI-AGENTLESS CLOUD RESOURCE MANAGEMENT

(71) Applicant: Futurewei Technologies, Inc., Plano, TX (US)

(72) Inventors: Luhui Hu, Bellevue, WA (US); Hui Zang, Cupertino, CA (US); Ziang Hu, Union City, CA (US)

(73) Assignee: Futurewei Technologies, Inc., Plano, TX (US)

(*) Notice: Subject to any disclaimer, the term of this patent is extended or adjusted under 35 U.S.C. 154(b) by 83 days.

(21) Appl. No.: 15/640,080

(22) Filed: Jun. 30, 2017

(65) Prior Publication Data

US 2019/0007410 A1 Jan. 3, 2019

(51) Int. Cl.
| | |
|---|---|
| *H04L 29/06* | (2006.01) |
| *H04L 9/32* | (2006.01) |
| *H04L 12/24* | (2006.01) |
| *H04L 12/26* | (2006.01) |
| *H04L 12/911* | (2013.01) |
| *H04L 29/08* | (2006.01) |

(52) U.S. Cl.
CPC ............ *H04L 63/10* (2013.01); *H04L 9/3297* (2013.01); *H04L 41/147* (2013.01); *H04L 41/20* (2013.01); *H04L 43/0876* (2013.01); *H04L 43/106* (2013.01); *H04L 47/70* (2013.01); *H04L 63/0281* (2013.01); *H04L 63/166* (2013.01); *H04L 67/10* (2013.01); *H04L 41/5038* (2013.01); *H04L 41/5096* (2013.01)

(58) Field of Classification Search
CPC ..... H04L 63/10; H04L 9/3297; H04L 63/166; H04L 41/20; H04L 43/0876; H04L 63/0281; H04L 41/5038; H04L 41/5096; H04L 47/70; H04L 67/10; H04L 43/106
USPC ................................ 713/151, 168, 171, 178
See application file for complete search history.

(56) References Cited

U.S. PATENT DOCUMENTS

| | | | |
|---|---|---|---|
| 7,322,032 B1 * | 1/2008 | Goss ......................... | G06F 7/24 370/218 |
| 8,826,344 B1 | 9/2014 | Gavade et al. | |

(Continued)

FOREIGN PATENT DOCUMENTS

| | | |
|---|---|---|
| CN | 104950837 A | 9/2015 |
| WO | 2016138067 A1 | 9/2016 |

OTHER PUBLICATIONS

Time series,From Wikipedia, the free encyclopedia. From https://en.wikipedia.org/wiki/Time_series. Jul. 24, 2017. total 12 pages.
(Continued)

*Primary Examiner* — Aravind K Moorthy
(74) *Attorney, Agent, or Firm* — Futurewei Technologies, Inc.

(57) ABSTRACT

A system, computer readable medium, and method are provided for a resource management in a cloud architecture. The method includes the steps of collecting a first time stamped data (TSD), and a second TSD, and generating a prediction model based on the first TSD and the second TSD. The method further includes collecting a third TSD, and predicting a fourth TSD based on the prediction model and the third TSD. With more data are obtained via the prediction, the resource management is more efficient and accurate.

20 Claims, 15 Drawing Sheets

(56) References Cited

U.S. PATENT DOCUMENTS

| | | | |
|---|---|---|---|
| 2006/0106599 A1* | 5/2006 | Horvitz | G01C 21/36 |
| | | | 704/219 |
| 2015/0043831 A1* | 2/2015 | Arfvidsson | G06F 16/5866 |
| | | | 382/228 |
| 2015/0281319 A1 | 10/2015 | Maturana et al. | |
| 2017/0091045 A1 | 3/2017 | Bangalore et al. | |
| 2017/0109735 A1* | 4/2017 | Sheng | G06Q 20/3678 |
| 2017/0141916 A1* | 5/2017 | Zhang | H04L 9/0891 |
| 2017/0270175 A1* | 9/2017 | Bantupalli | G06F 17/30578 |
| 2018/0048532 A1* | 2/2018 | Poort | H04L 41/147 |
| 2018/0097744 A1* | 4/2018 | Hu | H04L 47/823 |
| 2018/0174089 A1* | 6/2018 | Tulabandhula | G06Q 10/06393 |
| 2018/0189339 A1* | 7/2018 | Ananthakrishnan | |
| | | | G06F 17/30339 |
| 2018/0293511 A1* | 10/2018 | Bouillet | H04L 67/12 |

OTHER PUBLICATIONS

Agentless Monitoring with eG Enterprise Fast and flexible, unified IT monitoring: servers, applications, network, storage, virtualization and cloud, From https://www.eginnovations.com/product/agentless-monitoring, Jul. 24, 2017. total 7 pages.

Geek Speak, Agentless Versus Agent-Based Server Monitoring. From https://thwack.solarwinds.com/community/solarwinds-community/geek-speak_tht/blog/2013/02/11/agentless-versus-agent-based-server-monitoring. Feb. 11, 2013. total 2 pages.

Jeremy Sherwood, Agent vs. Agentless Monitoring. From https://www.sciencelogic.com/blog/agent-vs-agentless-monitoring, Oct. 11, 2011. total 7 pages.

Kubernetes Concepts, pods. From https://kubernetes.io/docs/concepts/workloads/pods/pod/. Jul. 24, 2017. total 9 pages.

* cited by examiner

QUASI-AGENTLESS CLOUD RESOURCE MANAGEMENT

FIELD OF THE INVENTION

The present disclosure relates to a cloud architecture for management resources, and more particularly to quasi-agentless cloud resource management solutions implemented in the cloud architecture.

BACKGROUND

The "cloud" is an abstraction that relates to resource management over a network and, more specifically, to an architecture that provides a platform for delivering services through a network. For example, the cloud may refer to various services delivered over the Internet such as network-based storage services or compute services. Typical cloud architecture deployments include a layered hierarchy that includes a physical layer of network hardware, and one or more software layers that enable users to access the network hardware. For example, one common type of cloud architecture deployment includes a physical layer of network resources (e.g., servers, storage device arrays, network switches, etc.) accompanied by a multi-layered hierarchical software framework that includes a first layer that implements Infrastructure as a Service (IaaS), a second layer that implements Platform as a Service (PaaS), and a third layer that implements Software as a Service (SaaS). In general, although there may be exceptions, resources in the third layer are dependent on resources in the second layer, resources in the second layer are dependent on resources in the first layer, and resources in the first layer are dependent on resources in the physical layer.

In conventional cloud architectures, the resources in the physical layer may be allocated to services implemented in the first layer (i.e., IaaS services). For example, a resource manager for the first layer may be configured to allocate resources in the physical layer to different IaaS services running in the first layer. In turn, the resources in the first layer (i.e., IaaS services) may be allocated to services implemented in the second layer (i.e., PaaS services). For example, a resource manager for the second layer may be configured to allocate resources in the first layer to different PaaS services running in the second layer. The resources in the second layer (i.e., PaaS services) may be allocated to services implemented in the third layer (i.e., SaaS services). For example, a resource manager for the third layer may be configured to allocate resources from the second layer to different SaaS services running in the third layer.

Resources in the cloud are partitioned vertically on a first-come, first-served basis where each resource manager only allocates the resources allocated to that resource manager to dependent services corresponding to that resource manager. In addition, the resource pools of the cloud may be partitioned horizontally into different clusters, such as by partitioning the total resources in the physical layer of the cloud into individual clusters partitioned by data center or availability zone. As such, each service implemented in a particular cluster only has access to the resources allocated to that cluster, which may be a subset of the resources included in the cloud.

The resulting allocation of resources in such architectures is typically inefficient. For example, a particular application (i.e., SaaS) in one cluster may have a high resource utilization rate as many users are using the particular application, which is slowed down because the application can only run on the resources allocated to that cluster, but another application in another cluster may have a low resource utilization rate because only a few users are using the particular application. The resource manager in the first level that allocates resources in the physical layer to the two different clusters may not have visibility into the resource utilization rates of different applications running on each cluster and, therefore, the resources of the physical layer may be utilized inefficiently.

SUMMARY

A system, computer readable medium, and method are provided for a resource management in a cloud architecture.

In some instances, one aspect of the subject matter described here may be implemented as a method including collecting a first time stamped data (TSD), where the first TSD includes a first timestamp, a first field and a second field, where the first field indicates a resource type of a first resource unit at the first timestamp, and the second field indicates a utilization of the first resource unit at the first timestamp. The method includes collecting a second TSD with an agent, where the second TSD includes the first timestamp, and a first key value pair, generating a prediction model based on the first TSD and the second TSD, and collecting a third TSD, where the third TSD includes a second timestamp, a third field and a fourth field, where the third field indicates a resource type of a second resource unit at the second timestamp, and the fourth field indicates a utilization of the second resource unit at the second timestamp.

The method further includes predicting a fourth TSD based on the prediction model and the third TSD, where the fourth TSD includes the second timestamp and a second key value pair. The predicting may be performed by a physically distributed but logically centralized cloud plane (PDLCCP), or by a resource manager or a fabric controller in the cloud architecture.

In some instances, one aspect of the subject matter described here may be a system for a resource management in a cloud architecture. The system includes a non-transitory memory storage including instructions, and one or more processors in communication with the memory. The one or more processors execute the instructions to collect a first time stamped data (TSD), where the first TSD includes a first timestamp, a first field and a second field, where the first field indicates a resource type of a first resource unit at the first timestamp, and the second field indicates a utilization of the first resource unit at the first timestamp, collect a second TSD with an agent, where the second TSD includes the first timestamp, and a first key value pair, generate a prediction model based on the first TSD and the second TSD, collect a third TSD, where the third TSD includes a second timestamp, a third field and a fourth field, where the third field indicates a resource type of a second resource unit at the second timestamp, and the fourth field indicates a utilization of the second resource unit at the second timestamp, and predict a fourth TSD based on the prediction model and the third TSD, where the fourth TSD includes the second timestamp and a second key value pair.

In some instances, one aspect of the subject matter described here may be implemented as a non-transitory computer-readable medium storing computer instructions for a resource management in a cloud architecture. The computer instructions when executed by one or more processors, cause the one or more processors to perform the steps of: collecting a first time stamped data (TSD), where the first TSD includes a first timestamp, a first field and a second field, where the first field indicates a resource type of a first resource unit at the first timestamp, and the second field indicates a utilization of the first resource unit at the first timestamp; collecting a second TSD with an agent, where the second TSD includes the first timestamp, and a first key value pair; generating a prediction model based on the first TSD and the second TSD; collecting a third TSD, where the third TSD includes a second timestamp, a third field and a fourth field, where the third field indicates a resource type of a second resource unit at the second timestamp, and the fourth field indicates a utilization of the second resource unit at the second timestamp; and predicting a fourth TSD based on the prediction model and the third TSD, where the fourth TSD includes the second timestamp and a second key value pair.

As a result, with more data are obtained via the prediction, the resource management is more efficient and accurate.

DETAILED DESCRIPTION

Conventionally, resource allocation in a cloud architecture has been implemented based on a resource dependence scheme, where each resource manager in the cloud requests resources from a parent resource manager. In such cloud architectures, many hundreds or thousands of resource managers may be implemented as hundreds or thousands of services are deployed within the cloud. This large network of dependent resource managers are not designed to communicate and, therefore, the allocation of resources among this multi-layered network of resource managers is very likely to become inefficient.

Figure 1A:
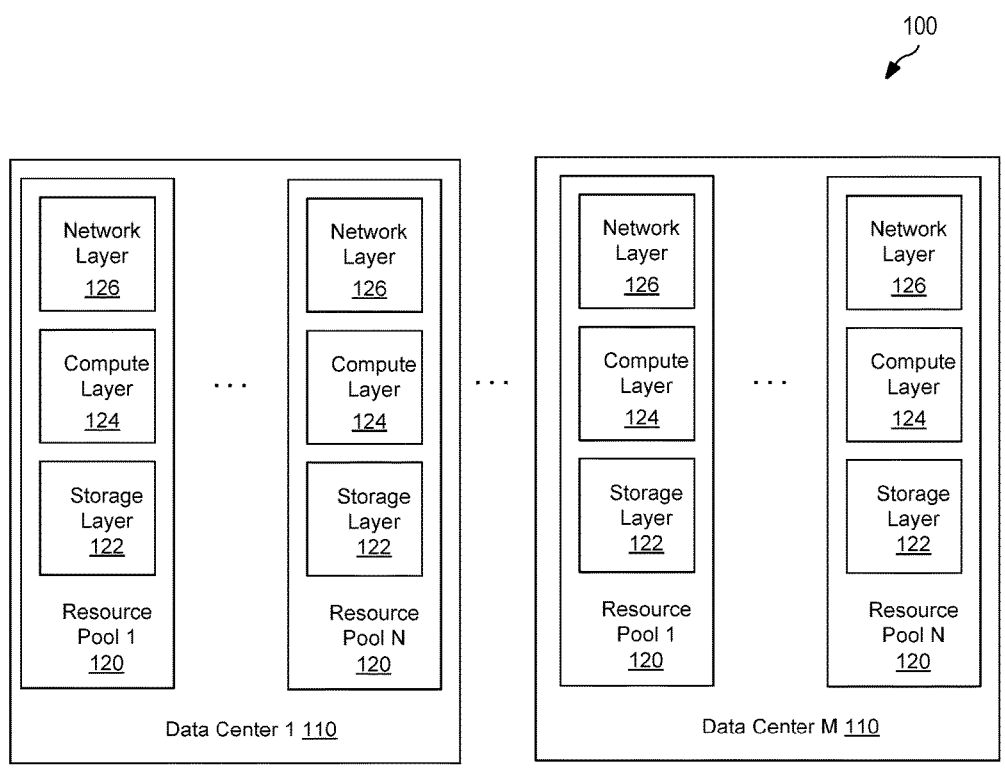
FIGS. 1A and 1B illustrate the infrastructure for implementing a cloud, in accordance with the prior art.
Figure 1B:
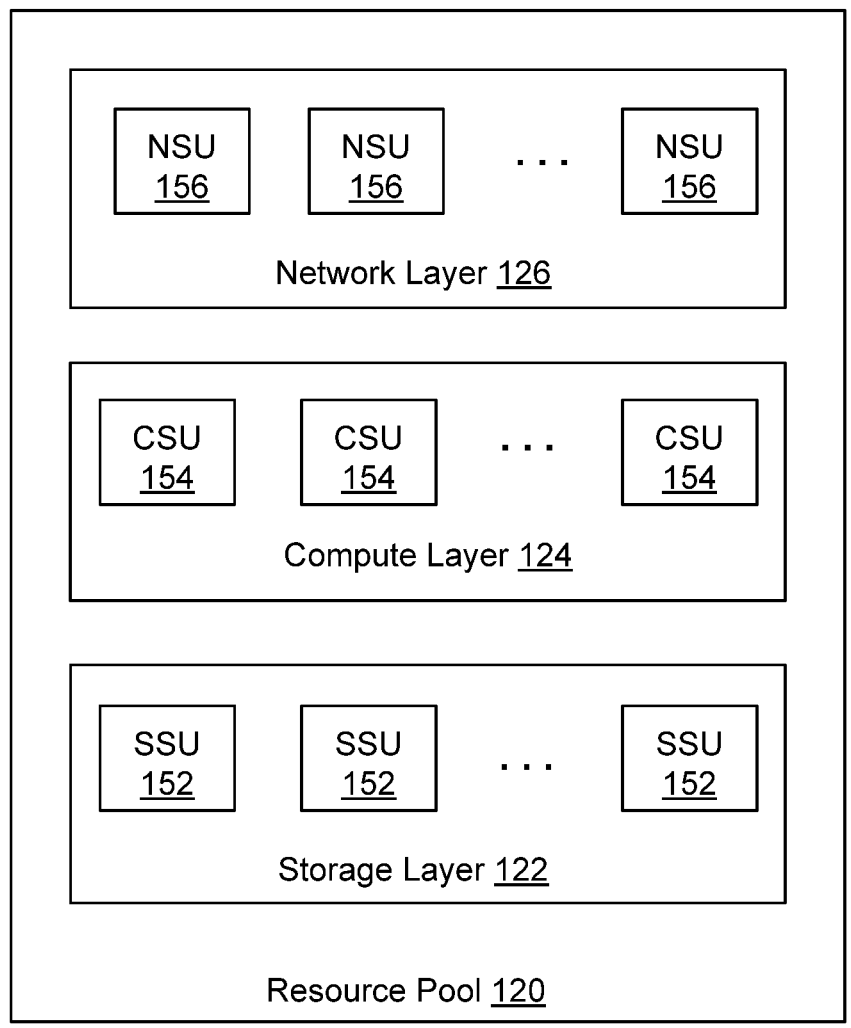

FIGS. 1A and 1B illustrate the infrastructure for implementing a cloud 100, in accordance with the prior art. The cloud 100, as used herein, refers to the set of hardware resources (compute, storage, and networking) located in one or more data centers (i.e., physical locations) and the software framework to implement a set of services across a network, such as the Internet. As shown in FIG. 1A, the cloud 100 includes a plurality of data centers 110, each data center 110 in the plurality of data centers 110 including one or more resource pools 120. A resource pool 120 includes a storage layer 122, a compute layer 124, and a network layer 126.

As shown in FIG. 1B, the storage layer 122 includes the physical resources to store instructions and/or data in the cloud 100. The storage layer 122 includes a plurality of storage area networks (SAN), each SAN provides access to one or more block level storage devices. The SANs are logically divided as storage scale units (SSU) 152. In one example, an SSU 152 includes one or more non-volatile storage devices accessible through the network. Examples of non-volatile storage devices include, but are not limited to, hard disk drives (HDD), solid state drives (SSD), flash memory such as an EEPROM or Compact Flash (CF) Card, random access memory (RAM), and the like. In another example, an SSU 152 is a RAID (Redundant Array of Independent Disks) storage array that combines multiple, physical disk drive components (e.g., a number of similar HDDs) into a single logical storage unit. In yet another example, an SSU 152 is a virtual storage resource that provides a level of abstraction to the physical storage resources such that a virtual block address may be used to reference data stored in one or more corresponding blocks of memory on one or more physical non-volatile storage devices. In such an example, the storage layer 122 may include a software framework, executed on one or more processors, for implementing the virtual storage resources.

The compute layer 124 includes the physical resources to execute processes (i.e., sets of instructions) in the cloud 100. The compute layer 124 may include a plurality of compute scale units (CSU) 154, each CSU 154 including at least one processor and a software framework for utilizing the at least one processor. In one example, a CSU 154 includes one or more servers (e.g., blade servers) that provide physical hardware to execute sets of instructions. Each server may include one or more processors (e.g., CPU(s), GPU(s), ASIC(s), FPGA(s), DSP(s), etc.) as well as volatile memory for storing instructions and/or data to be processed by the one or more processors. The CSU 154 may also include an operating system, loaded into the volatile memory and executed by the one or more processors, that provides a runtime environment for various processes to be executed on the hardware resources of the server. In another example, a CSU 154 is a virtual machine that provides a collection of virtual resources that emulate the hardware resources of a server. The compute layer 124 may include a hypervisor or virtual machine monitor that enables a number of virtual machines to be executed substantially concurrently on a single server.

The network layer 126 includes the physical resources to implement networks. In one example, the network layer 126 includes a number of switches and/or routers that enable data to be communicated between the different resources in the cloud 100. For example, each server in the compute layer 124 may include a network interface controller (NIC) coupled to a network interface (e.g., Ethernet). The interface may be coupled to a network switch that enables data to be sent from that server to another server connected to the network switch. The network layer 126 may implement a number of layers of the OSI model, including the Data Link layer (i.e., layer 2), the network layer (i.e., layer 3), and the Transport layer (i.e., layer 4). In one example, the network layer 126 implements a virtualization layer that enables virtual networks to be established within the physical network. In such examples, each network scale unit (NSU) 156 in the network layer 126 is a virtual private network (VPN), and may include one or more input/output (IO) interface.

It will be appreciated that each data center 110 in the plurality of data centers may include a different set of hardware resources and, therefore, a different number of resource pools 120. Furthermore, some resource pools 120 may exclude one or more of the storage layer 122, compute layer 124, and/or network layer 126. For example, one resource pool 120 may include only a set of servers within the compute layer 124. Another resource pool 120 may include both a compute layer 124 and network layer 126, but no storage layer 122.

Figure 2:
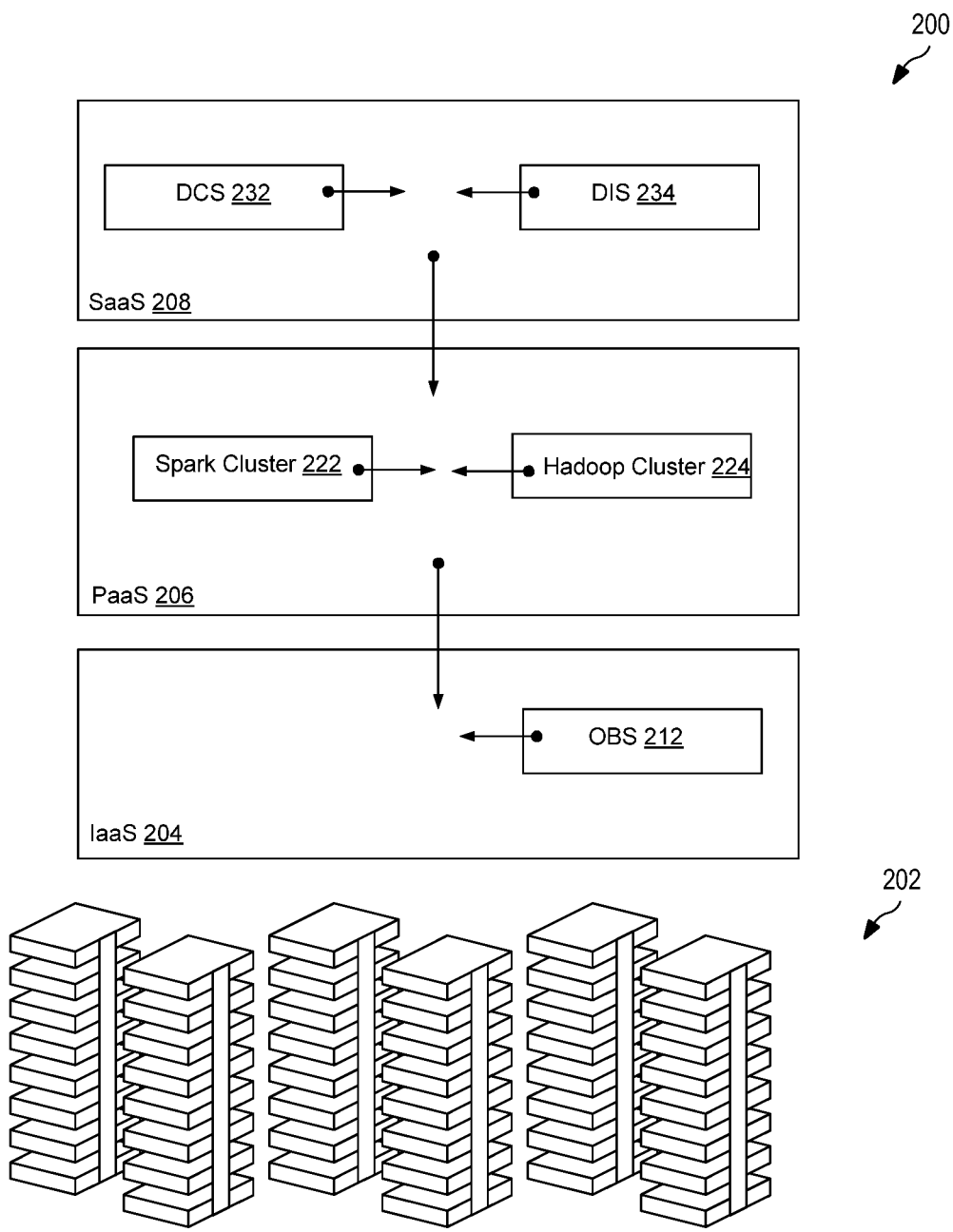
FIG. 2 is a conceptual illustration of a cloud architecture, in accordance with the prior art.

FIG. 2 is a conceptual illustration of a cloud architecture 200, in accordance with the prior art. As shown in FIG. 2, the cloud architecture 200 is represented as a plurality of hierarchical layers. The cloud architecture 200 includes a physical layer 202, an Infrastructure as a Service (IaaS) layer 204, a Platform as a Service (PaaS) layer 206, and a Software as a Service (SaaS) layer 208. The physical layer 202 is the collection of hardware resources that implement the cloud. In one example, the physical layer 202 is implemented as shown in FIGS. 1A and 1B.

The IaaS layer 204 is a software framework that enables the resources of the physical layer 202 to be allocated to different infrastructure services. In one example, the IaaS layer 204 includes a resource manager for allocating resource units (e.g., SSU 152, CSU 154, and NSU 156) in the resource pools 120 of the physical layer 202 to services implemented within the IaaS layer 204. As shown in FIG. 2, services such as an Object Storage Service (OBS) 212 may be implemented in the IaaS layer 204. The OBS 212 is a cloud storage service for unstructured data that enables a client to store data in the storage layer 122 of one or more resource pools 120 in the physical layer 202. The OBS 212 may manage where data is stored (i.e., in what data center(s), on which physical drives, etc.) and how data is stored (i.e., n-way replicated data, etc.).

Each service in the IaaS layer 204 may include a separate resource manager that manages the resources allocated to the service. As shown in FIG. 2, black dots within a particular service denote a resource manager for that service and arrows represent a request for resources made by the resource manager of the service to a parent resource manager. In the case of the OBS 212, a resource manager within the OBS 212 requests resources from the resource manager of the IaaS layer 204. Again, the resource manager of the IaaS layer 204 manages the resources from the physical layer 202.

The OBS 212 is only one example of a service implemented within the IaaS layer 204, and the IaaS layer 204 may include other services in addition to or in lieu of the OBS 212. Each service will be instantiated with different instances. Furthermore, the IaaS layer 204 may include multiple instances of the same service, such as multiple instances of the OBS 212, each instance having a different client facing interface, such that different services may be provisioned for multiple tenants.

The next layer in the hierarchy is the PaaS layer 206. The PaaS layer 206 provides a framework for implementing one or more platform services. For example, as shown in FIG. 2, the PaaS layer 206 may include instances of a Spark Cluster service 222 and a Hadoop Cluster service 224. The Spark Cluster service 222 implements an instance of the Apache™ Spark® platform, which includes a software library for processing data on a distributed system. The Hadoop Cluster service 224 implements an instance of the Apache™ Hadoop® platform, which also includes a software library for processing data on a distributed system. Again, the Spark Cluster service 222 and the Hadoop Cluster service 224 are merely examples of platform services implemented within the PaaS layer 206, and the PaaS layer 206 may include other services in addition to or in lieu of the Spark Cluster service 222 and the Hadoop Cluster service 224.

The platform services in the PaaS layer 206, such as the Spark Cluster service 222 and the Hadoop Cluster service 224, each include an instance of a resource manager. The Spark Cluster service 222 and the Hadoop Cluster service 224 may both utilize the Apache YARN resource manager. These resource managers may request resources from a parent resource manager of the PaaS layer 206. The resource manager of the PaaS layer 206 manages the resources from the IaaS layer 204 allocated to the PaaS layer 206 by the resource manager in the IaaS layer 204.

The top layer in the hierarchy is the SaaS layer 208. The SaaS layer 208 may provide a framework for implementing one or more software services. For example, as shown in FIG. 2, the SaaS layer 208 may include instances of a Data Craft Service (DCS) 232 and a Data Ingestion Service (DIS) 234. The SaaS layer 208 may also include instances of a data pipeline service (DPS) 236 (now shown in FIG. 2). The DCS 332 implements an application for processing data, such as transferring or transforming data. The DIS 234 implements an application for ingesting data, such as collecting data from a variety of different sources and in a variety of different formats and processing the data to be stored in one or more different formats. Again, the DCS 332 and the DIS 234 are merely examples of application services implemented within the SaaS layer 208, and the SaaS layer 208 may include other services in addition to or in lieu of the DCS 332 and the DIS 234.

The DCS 332 and the DIS 234 each include an instance of a resource manager. These resource managers may request resources from a parent resource manager of the SaaS layer 208. The resource manager of the SaaS layer 208 manages the resources allocated to the SaaS layer 208 by the resource manager of the PaaS layer 206.

It will be appreciated that each resource manager in the cloud architecture 200 is associated with a corresponding parent resource manager from which resource units are requested, which may be referred to herein as resource dependence. There may be exceptions to the arrows depicting resource dependence as shown in FIG. 2 when the resource dependence spans layers, such as if the Spark Cluster service 222 may request resources directly from the resource manager of the IaaS layer 204 rather than from the resource manager of the PaaS layer 206. However, in such resource dependence schemes, no single resource manager has visibility into each and every resource unit deployed in the cloud. Thus, no single resource manager can effectively manage the allocation of resource units between different services based on the utilization of each resource unit in the cloud. Correspondingly, cloud high availability (HA) for evenly distributing computing or storage resources across availability zones and racks is inefficient. Cloud locality between computing and storage resources is also inefficient.

It will be appreciated that the cloud architecture 200 shown in FIG. 2 is only one type of architecture framework implemented in conventional clouds. However, other cloud architectures may implement different frameworks. For example, a cloud architecture may include the IaaS layer 204 and the SaaS layer 208 without any intervening PaaS layer 206. In another example, a cloud architecture may include a Container as a Service (CaaS) layer (i.e., a new way of resource virtualization without IaaS and PaaS) plus an SaaS layer on top of the CaaS layer. In each instance, these cloud architectures employ a resource dependence scheme for requesting resources on which to run the service.

Multi-layered resource dependence scheme is very likely to become inefficient. One possible solution to the resource allocation problem is to transition from a distributed, multi-layered resource dependence scheme to a physically distributed, logically central resource allocation scheme. In this scheme, allocation of resources among this multi-layered network is harmoniously coordinated by a physically distributed, but logically centralized cloud plane (PDLCCP). PDLCCP can also be called as a resource broker. The PDLCCP is tasked with efficiently distributing resource units among all of the services deployed within the cloud.

Figure 3A:
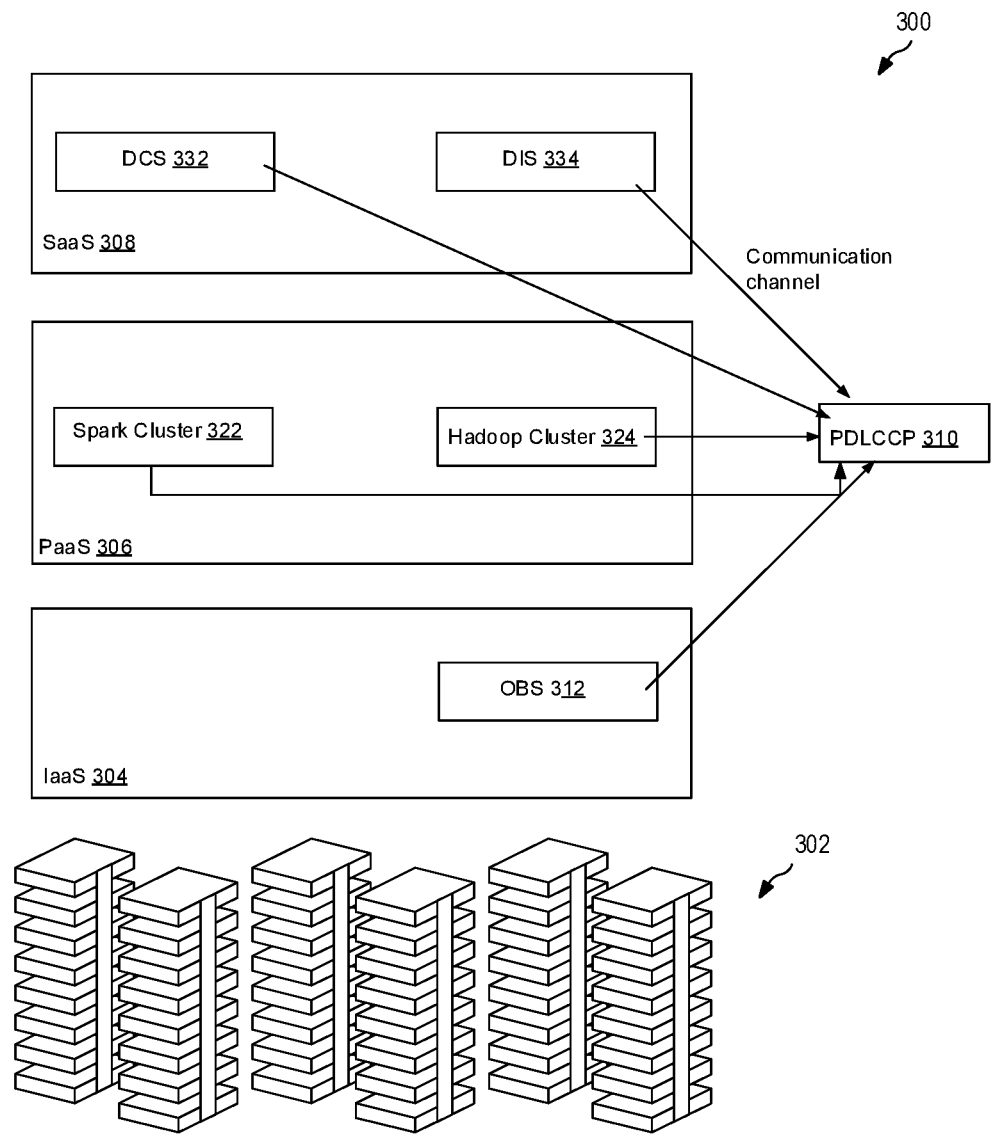
FIG. 3A is a conceptual illustration of a cloud architecture, in accordance with one embodiment.

FIG. 3A is a conceptual illustration of a cloud architecture 300, in accordance with one embodiment. As shown in FIG. 3A, the cloud architecture 300 is represented as a plurality of hierarchical layers, similar to the cloud architecture 200 shown in FIG. 2. The hierarchical layers may include a physical layer 302, an IaaS layer 304, a PaaS layer 306, and a SaaS layer 308. The IaaS layer 304 may include instances of various infrastructure services, such as the OBS 312; the PaaS layer 306 may include instances of various platform services, such as the Spark Cluster service 322 and the Hadoop Cluster service 324; and the SaaS layer 308 may include instances of various application services, such as the DCS 332 and the DIS 334. Again, the types or number of services implemented in each layer may vary according to a particular deployment of services in the cloud.

The cloud architecture 300 shown in FIG. 3A differs from the cloud architecture 200 shown in FIG. 2 in that the scheme utilized for resource allocation is not based on resource dependence. Instead, the cloud architecture 300 shown in FIG. 3A includes a PDLCCP 310 that allocates resource units to each layer or service deployed in the cloud.

In one embodiment, PDLCCP 310 may track the resources available in the cloud. PDLCCP 310 may discover each of the resource units included in the physical layer 302 such as by polling each node in the cloud to report what resource units are included in the node. Alternatively, PDLCCP 310 may read a configuration file, maintained by a network administrator that identifies the resource units included in the physical layer 302 of the cloud. In addition, each layer and/or service deployed within the cloud may stream resource information to PDLCCP 310 that specifies any additional resource units implemented by those layers and/or services. PDLCCP 310 is then tasked with allocating these resource units to other layers and/or services in the cloud. As a result, PDLCCP 310 has visibility into the overall resource units and resource requirements, and then allocate resource units independently to each layer of the cloud. Thus, the physically distributed, logically central resource allocation scheme may allocate resource units efficiently in the cloud.

In one embodiment, PDLCCP 310 is executed on a node within the cloud architecture. More specifically, PDLCCP 310 may be loaded on a server and executed by a processor on the server. PDLCCP 310 may be coupled to other servers through network resources in the physical layer 302. PDLCCP 310 may have one or more instances. If the cloud architecture 300 includes a plurality of instances of PDLCCP 310, the plurality of instances of PDLCCP 310 may be loaded onto a plurality of different servers. The multiple instances of PDLCCP 310 may be configured to communicate such that resource allocation is planned globally be all instances of PDLCCP 310.

As used herein, a resource unit may refer to any logical unit of a resource. In the case of the physical layer 302, each resource unit may refer, e.g., to a SSU 152, a CSU 154, or a NSU 156. These resource units can be allocated throughout the layers of the cloud. However, each layer and/or service may also define additional resource units that refer to virtual resources implemented by that layer or service. For example, the Spark Cluster service 222 may implement one or more Spark Clusters by grouping, logically, one or more resource units allocated to the Spark Cluster service 222 along with a framework for utilizing those resource units. Consequently, other services, such as services in the SaaS layer 308, may request the allocation of a Spark Cluster rather than the hardware resource units of the physical layer 302. In this case, a resource unit may refer to a Spark Cluster.

A resource pool (or a group) includes a storage layer, a compute layer, and a network layer. The storage layer is logically divided as a plurality of storage scale units (SSU). The storage layer includes one or more non-volatile storage devices (e.g., HDD(s), SSD(s), EEPROM(s), CF Card(s), RAM(s) or Disk(s)) accessible through the network. The compute layer is logically divided as a plurality of compute scale units (CSU). The compute layer includes at least one processor (e.g., CPU(s), GPU(s), ASIC(s), FPGA(s), or DSP(s)) and a software framework for utilizing the at least one processor. The network layer is logically divided as a plurality of network scale units (NSU). The network layer includes one or more input/output (IO) interface. Each scale unit, for example, SSU, SCU, or NSU, includes one or more pod. Pods are the smallest deployable units of computing that can be created and managed in cloud. A pod (as in a pod of whales or pea pod) is a group of one or more containers (such as Docker containers). In some embodiments, pods are co-located and co-scheduled, and run in a shared context. A pod models an application-specific "logical host"—it contains one or more application containers which are relatively tightly coupled—in a pre-container world, they would have executed on the same physical or virtual machine. Containers are deployed based on operating-system-level virtualization rather than hardware virtualization.

Figure 3B:
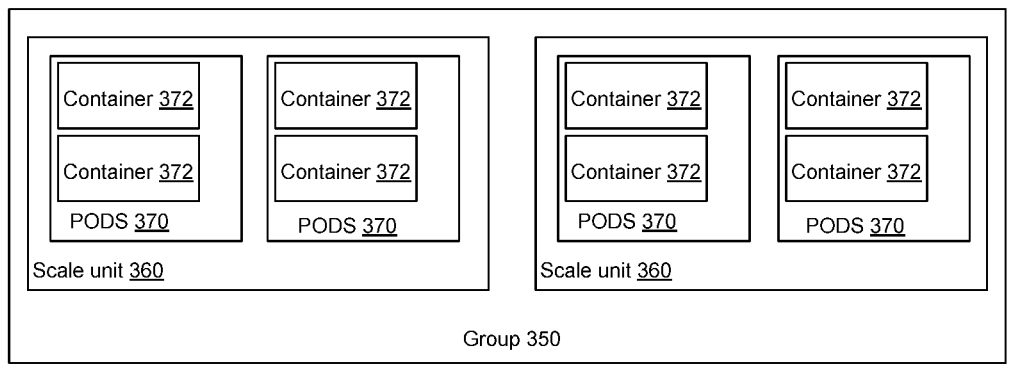
FIG. 3B is a conceptual illustration of a cloud architecture, in accordance with one embodiment.

As shown in FIG. 3B, group 350 (or a resource pool) includes multiple scale units 360. Each scale unit 360 includes multiple pods 370. Each pod 370 includes multiple containers 372.

The system pre-defines profile standard, format or structure. Profile includes but not limited to Time Stamped Data (TSD). Time stamped data includes but not limited to time series data. For example, the resource information streamed to PDLCCP 310 includes TSD. Table 1 is an example for the TSD format.

TABLE 1

| Timestamp | Resource Type | Resource Value | Resource Unit | Container | Pod | Scale Unit | Service | Group |
|---|---|---|---|---|---|---|---|---|
| 897893498 | CPU | 15 | % | C1 | P2 | S1 | DCS | PaaS1 |
| 897893499 | CPU | 16 | % | C1 | P2 | S1 | DCS | PaaS1 |
| 897893500 | CPU | 14 | % | C1 | P2 | S1 | DCS | PaaS1 |
| 897893498 | GPU | 80 | % | C2 | P2 | S1 | DPS | PaaS1 |
| 897893499 | GPU | 81 | % | C2 | P2 | S1 | DIS | PaaS1 |
| 897893498 | IO | 19 | kb/s | C2 | P2 | S1 | DIS | PaaS1 |
| 897893499 | IO | 20 | Kb/s | C2 | P2 | S1 | DIS | PaaS1 |
| 897893500 | IO | 20 | Kb/s | C1 | P2 | S1 | DCS | PaaS1 |
| 897893498 | SSD | 229 | kB | C1 | P2 | S1 | DIS | PaaS1 |
| 897893499 | SSD | 230 | kB | C1 | P2 | S1 | DIS | PaaS1 |
| 897893498 | RAM | 108 | kB | C1 | P2 | S1 | DIS | PaaS1 |
| 897893499 | RAM | 110 | kB | C1 | P2 | S1 | DCS | PaaS1 |
| 897893500 | RAM | 116 | kB | C2 | P2 | S1 | DCS | PaaS1 |
| 897893498 | DISK | 2008 | kB | C2 | P2 | S1 | DCS | PaaS1 |
| 897893499 | DISK | 2009 | kB | C2 | P2 | S1 | DCS | PaaS1 |

Table 1 includes multiple key value pairs. If a service type field is a key in a key value pair, and other field (such as Resource Value, Resource Unit, Container, Pod, Scale Unit, Service, or Group) may be value in the key value pair. For example, at Timestamp 897893498, the resource pool provides computer resources (CPU and GPU), network resources (IO), and storage resources (SSD, RAM and DISK). At Timestamp 897893498, the resource value of CPU is 15%. The CPU belongs to container C1, pod P2, and Scale unit S1 in PaaS1 group. The CPU provides DCS. The resource value of GPU is 80%. The GPU belongs to container C2, pod P2, and Scale unit S1 in PaaS1 group. The GPU provides DPS. The resource value of IO is 19 kb/s. The IO belongs to container C2, pod P2, and Scale unit S1 in PaaS1 group. The IO provides DIS. The resource value of SSD is 229 kB. The SSD belongs to container C1, pod P2, and Scale unit S1 in PaaS1 group. The SSD provides DIS. The resource value of RAM is 108 kB. The RAM belongs to container C1, pod P2, and Scale unit S1 in PaaS1 group. The RAM provides DIS. The resource value of DISK is 2008 kB. The DISK belongs to container C2, pod P2, and Scale unit S1 in PaaS1 group. The DISK provides DCS.

The resource unit collects time stamped data with built-in software (agentless), and sends the TSD to PDLCCP 310. Usually, built-in software belongs to operating system (OS), and is a general software. Agentless means no deployment of an agent but does not mean that there is not an agent component. The resource unit may collect TSD at a timestamp, and sends the TSD to PDLCCP 310. Or the resource unit may collect a package of TSD at different timestamps, and sends the package of TSD to PDLCCP 310.

Table 1 is an example to explain the data collected by built-in software (agentless). More or fewer fields are possible for the TSD collected by the built-in software (agentless).

Figure 4:
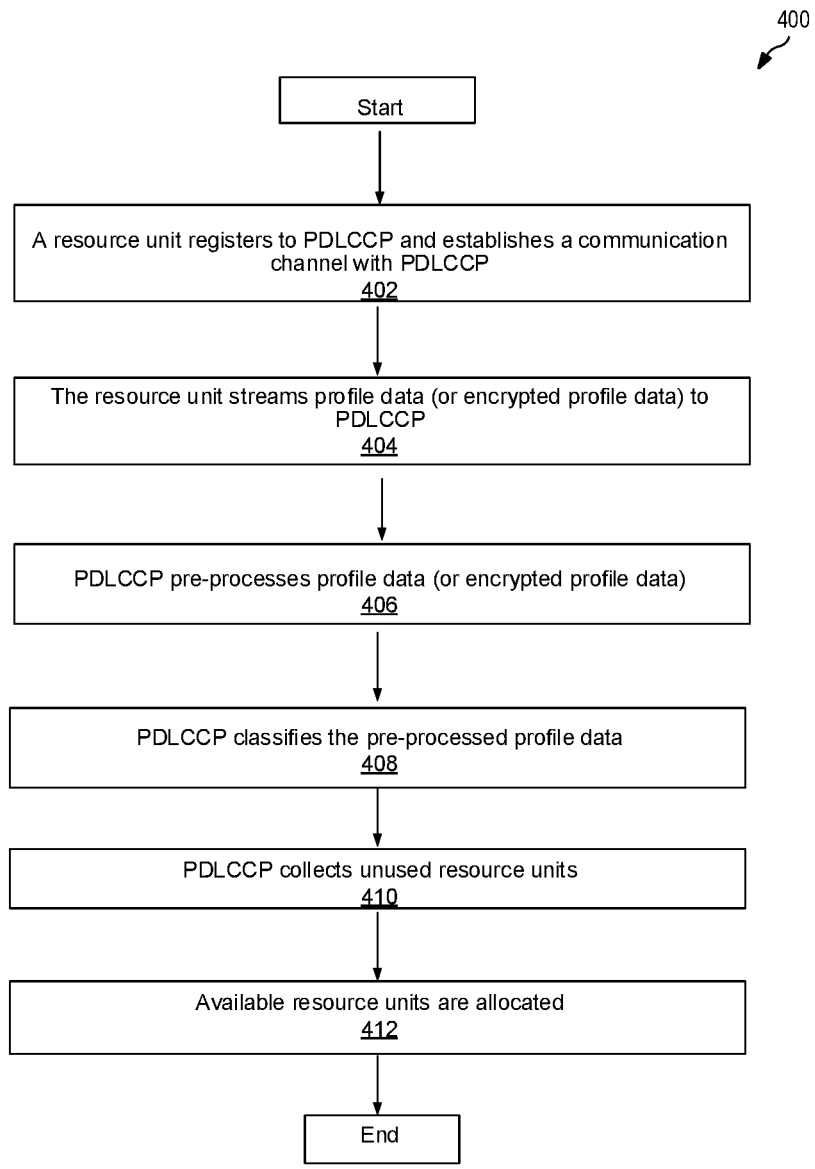
FIG. 4 is a flowchart of a method for resource management, in accordance with one embodiment.

FIG. 4 is a flowchart of a method 400 for resource management, in accordance with one embodiment. There are a plurality of big data clusters (such as Hadoop Cluster 324 and Spark Cluster 322) or independent big data resource pools (such as DCS 332 and DIS 334) in a cloud provider, and they may run in (or be part of) PaaS or IaaS, which has its own resource manager or fabric controller as well. At step 402, each resource unit registers to PDLCCP 310 and establishes a communication channel with PDLCCP 310. At step 404, each resource unit streams profile data (such as, TSD) to PDLCCP 310 through the established communication channel. The profile data includes but is not limited to resource types, resource value (or utilization), big data or other task execution plans with built-in software. The profile data may be encrypted for security reasons when the profile data is sent to PDLCCP 310.

The resource unit sends the profile data (or encrypted profile data) to PDLCCP 310 asynchronously or synchronously. In the asynchronous scheme, the resource unit sends the profile data (or encrypted profile data) to PDLCCP 310 as Time Stamped Data (TSD) and Real Time (RT) data ingestion. At synchronously scheme, the resource unit sends the profile data (or encrypted profile data) to PDLCCP 310 using an agent-less probing. Agentless probing means probing that uses a built-in software (or referred to as a built-in programming model).

At step 406, PDLCCP 310 pre-processes the profile data (or the encrypted profile data). For example, PDLCCP 310 may pre-process profile data sent by a resource unit, or may pre-process profile data sent by multiple resource units. The pre-processing includes but is not limited to sorting, aggregation, filtering, or combinations of these. By way of illustration, PDLCCP 310 may filter out noises from the profile data, aggregate data, calculate data, or combinations of these. After pre-processing the profile data (or the encrypted profile data), PDLCCP 310 may classify the pre-processed profile data into a resource manager/fabric controller (RM/FC)-aware scheme for global resource demand request at step 408. After classifying, PDLCCP 310 may also manage (or orchestrate) the classified profile data.

At step 410, PDLCCP 310 collects unused resource units based on the classified profile data and historical resource metadata. The historical resource metadata are stored data to that records used or reserved resource units. At step 412, available resource units are allocated to each layer or service deployed in the cloud. In one embodiment, PDLCCP 310 updates a resource allocation plan to indicate a number of resource units allocated to each layer or service deployed in the cloud. PDLCCP 310 may be configured with a number of algorithms for determining how to allocate resources among the plurality of layers. Types of algorithms include, but are not limited to, first-come, first-served algorithms, priority-based algorithms, and machine-learning algorithms based on resource utilization statistics.

At step 414 (not shown in FIG. 4), each resource manager can retrieve allocated resource information from built-in software or a resource proxy. Each resource manager can now focus on its fine-grained resource management or leave it to the PDLCCP except for application business logic scheduling and monitoring. Each resource manager or fabric controller in PaaS and IaaS can delegate resource management to the PDLCCP but focus on platform and other business logic.

Figure 5:
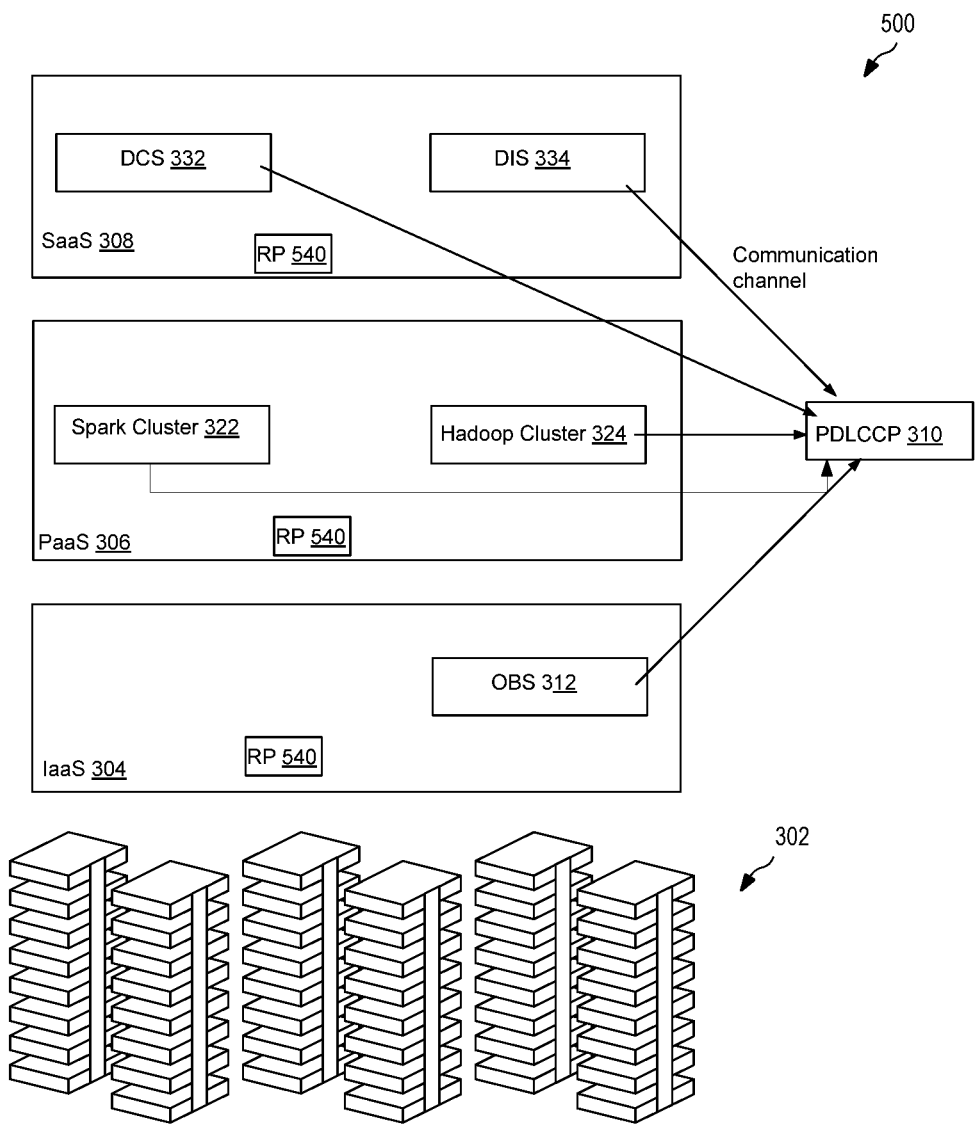
FIG. 5 is a conceptual illustration of a cloud architecture, in accordance with one embodiment.

FIG. 5 is a conceptual illustration of a cloud architecture 500, in accordance with one embodiment. The cloud architecture 500 shown in FIG. 5 differs from the cloud architecture 300 shown in FIG. 3A in that the scheme utilized for resource allocation includes one or more resource proxy (RP). The resource proxy makes managing a group of resource units easier. For example, each layer in the cloud may include resource proxy 540. In one embodiment, resource proxy 540 is a software module configured to manage the resources allocated to that resource proxy 540. Resource proxy 540 may request resource units from PDLCCP 310. Consequently, every resource proxy 540 deployed in the cloud is dependent on PDLCCP 310 such that PDLCCP 310 can allocate resource units more efficiently within the cloud. PDLCCP 310 may have one or more instances. If the cloud architecture 300 includes a plurality of instances of PDLCCP 310, the plurality of instances of PDLCCP 310 may be loaded onto a plurality of different servers such that any resource proxy 540 deployed in the cloud may request resource units from any instance of the resource manger 310 by transmitting the request to one instance of PDLCCP 310 via the network.

The plurality of resource proxies 540 may include a variety of resource proxy types. Each resource proxy 540 includes logic to implement a variety of functions specific to the type of layer or service associated with resource proxy 540. In one embodiment, a resource proxy 540 is a stand-alone module designed with specific functionality for a particular layer or service. In another embodiment, a resource proxy 540 is a container that wraps an existing resource manager of a service. For example, a service that was written for an existing cloud architecture may be modified to include a resource proxy 540 that wraps the resource manager implemented in the service of the existing cloud architecture. The container may utilize the logic of the previous resource manager for certain tasks while making the resource manager compatible with PDLCCP 310. In yet another embodiment, resource proxy 540 is a lightweight client, such that only a basic amount of logic is included in resource proxy 540 and more complex logic is assumed to be implemented, if needed, by PDLCCP 310.

Figure 6:
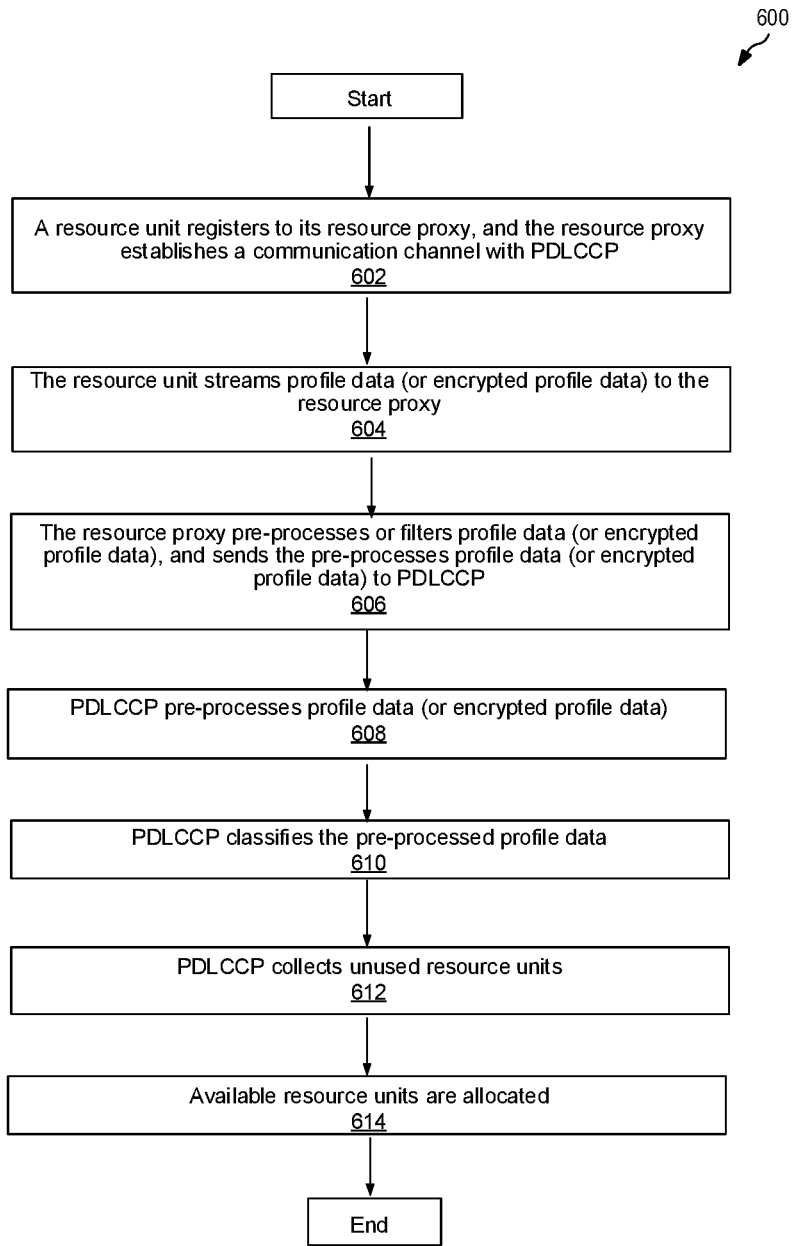
FIG. 6 is a flowchart of a method for resource management, in accordance with one embodiment.

FIG. 6 is a flowchart of a method 600 for resource management, in accordance with one embodiment. The method shown in FIG. 6 differs from the method 400 shown in FIG. 4 in that the scheme utilized for resource allocation includes multiple resource proxies.

At step 602, each resource unit registers with its resource proxy 540, and resource proxy 540 establishes a communication channel with PDLCCP 310. At step 604, each resource unit streams profile data (such as TSD) to resource proxy 540. The profile data may be encrypted for security reasons when the profile data is sent to the resource proxy. In one embodiment, a resource proxy 540 is configured to generate a data structure in a memory to store profile data. The profile data includes but is not limited to the resource types, resource utilization (or value), big data or task execution plans for a built-in software. Other types of profile data are possible. The profile data may include information related to resource units made available by a layer or service associated with resource proxy 540, a number of tasks currently managed by resource proxy 540, and the like. For example, the profile data may include TSD as shown in Table 1.

At step 606, the resource proxy optionally pre-processes or filters the profile data (or encrypted profile data) for simplification or to prevent sending too much data to PDLCCP 310. The pre-processing at resource proxy is about light-weight pre-processing. The pre-processing is included but not limited to filtering, by-passing or grouping. After resource proxy processes or filters the profile data (or encrypted profile data), the resource proxy sends processed or filtered profile data to PDLCCP 310.

At step 608, PDLCCP 310 pre-processes profile data (or encrypted profile data) received from resource proxy 540. Such as, PDLCCP 310 may pre-process profile data sent by a resource proxy 540, or may pre-process profile data sent by multiple resource proxies 540. The pre-processing includes but not limited to sorting, aggregation, or filtering. The pre-processing at PDLCCP is a global pre-processing, so it is different from light-weight pre-processing at resource proxy. For example, PDLCCP 310 may filter out noise from the profile data, aggregate and compute some data. After pre-processing the profile data (or the encrypted profile data), PDLCCP 310 may classify the pre-processed profile data into a resource manager/fabric controller (RM/FC)-aware scheme for global resource demand request at step 610.

At step 612, unused resource units are collected. In one embodiment, PDLCCP 310 is configured to compare the number of resource units currently allocated to a resource proxy 540 with the number of tasks managed by resource proxy 540. If the number of resource units allocated to resource proxy 540 exceeds the number of resource units necessary to execute the number of tasks managed by resource proxy 540, then PDLCCP 310 may release at least some of the resource units allocated to resource proxy 540 to allow those resource units to be allocated to different resource proxies 540. PDLCCP 310 may track how many resource units are currently allocated to various resource proxies 540 and how many resource units are available to be allocated to resource proxies 540.

At step 614, available resource units are allocated to each resource proxy 540 in the plurality of resource proxies 540. In one embodiment, PDLCCP 310 updates a resource allocation plan to indicate a number of resource units allocated to each resource proxy 540. PDLCCP 310 may be configured with a number of algorithms for determining how to allocate resources among the plurality of resource proxies 540. Types of algorithms include, but are not limited to, first-come, first-served algorithms, priority-based algorithms, and machine-learning algorithms based on resource utilization statistics. In one embodiment, resource proxy 540 may utilize resource units allocated to resource proxy 540 for executing tasks managed by resource proxy 540.

Figure 7:
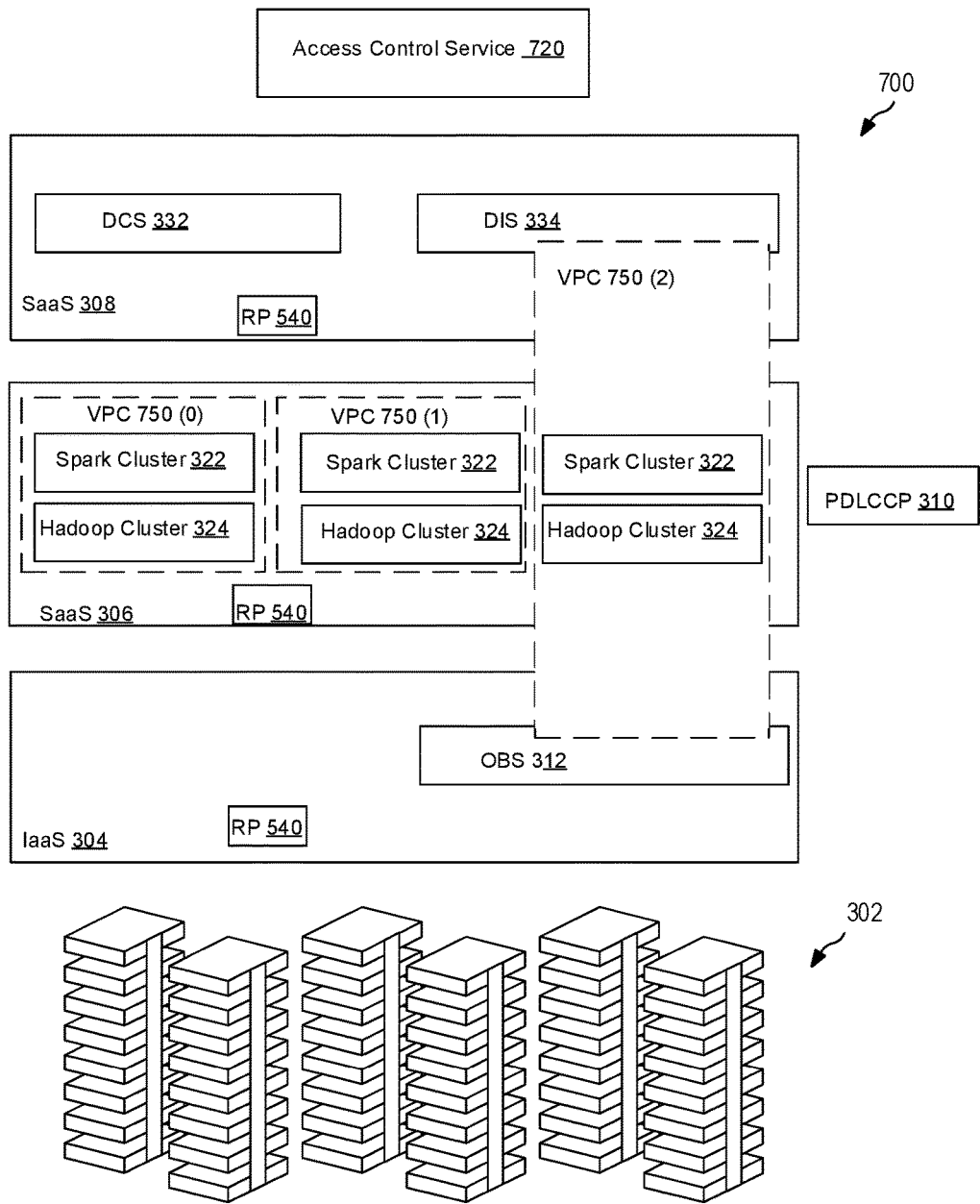
FIG. 7 is a conceptual illustration of a cloud architecture, in accordance with one embodiment.

FIG. 7 is a conceptual illustration of a cloud architecture 700, in accordance with one embodiment. As shown in FIG. 7, the cloud architecture 700 is represented as a plurality of hierarchical layers, similar to the cloud architecture 300 shown in FIG. 3A and the cloud architecture 500 shown in FIG. 5. The cloud architecture 700 may include a number of services in the different hierarchical layers (e.g., layers 304, 306, 308).

The cloud architecture 700 also includes provisions for virtual private clouds (VPCs) 750. A VPC 750 is a set of resources/services allocated to a particular client, such as a business customer. A number of users for the client may be granted access to the VPC 750 to perform tasks using the resources/services included in the VPC 750. As shown in FIG. 7, a VPC 750 may include resources/services in a particular layer of the cloud (e.g., VPC 750(0) and VPC 750(1)) or the VPC 750 may include resources/services across multiple layers of the cloud (e.g., VPC 750(2)). It will be appreciated that the resources and/or services allocated within a VPC 750 may be assigned to a particular client and, therefore, access to the VPC 750 should be restricted to an authorized user.

When any user creates a task for any service within the VPC 750, the user needs to be authorized to access the VPC 750. The authentication is performed by transmitting a request from resource proxy 540 to an access control service

720. The access control service 720 is configured to check credentials provided by the user in order to authenticate the user. In one embodiment, the credentials may include a username/password combination that is checked against a database of username/password pairs authorized by the client. If the password provided with the username matches the password store in the database of username/password pairs authorized by the client, then the access control service 720 may authorize the user. An authorized user may be referred to herein as a tenant of the VPC 750. The access control service 720 transmits a response to resource proxy 540 that indicates whether the user for a particular task is an authorized tenant. If the user is an authorized tenant of the VPC 750, then resource proxy 540 manages the execution of the task by a particular service in the VPC 750. However, if the user is not an authorized tenant of the VPC 750, then resource proxy 540 prevents execution of the task by the services in the VPC 750, thereby restricting access to the VPC 750 to only authorized tenants.

Figure 8:
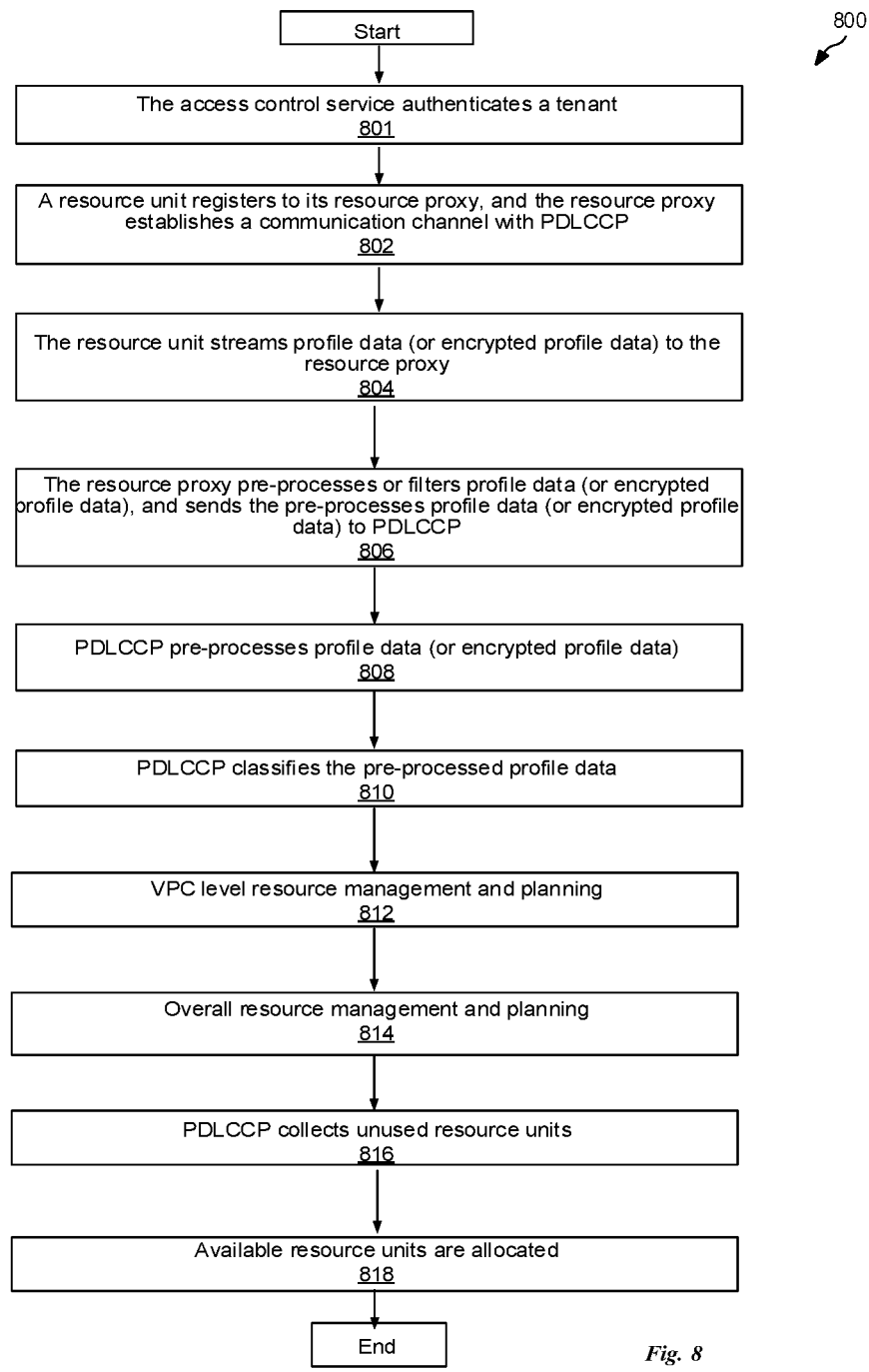
FIG. 8 is a flowchart of a method for resource management, in accordance with one embodiment.

FIG. 8 is a flowchart of a method 800 for managing the allocation of resources in a cloud, in accordance with one embodiment. The method shown in FIG. 8 differs from the method 600 shown in FIG. 6 in that the scheme utilized for resource allocation includes access control service 720.

At step 801, the access control service 720 authenticates a tenant associated with a resource proxy 540. In one embodiment, a user initiates a request to utilize a service in a VPC 750 to perform a task. The request includes credentials for the user and is received at resource proxy 540 for the VPC 750. Resource proxy 540 transmits a request to authenticate the user to the access control service 720, where the request includes the credentials of the user. The access control service may check the credentials provided by the user against a database of credentials of authorized tenants granted access to the VPC 750. The access control service 720 transmits a message to resource proxy 540 to authenticate the user as an authorized tenant if the credentials provided by the user match the credentials in the database.

Steps 802, 804, 806, 808 and 810 in FIG. 8 are similar as steps 602, 604, 606, 608 and 610 in FIG. 6. Knowing the overall resource needs in different types and different time periods, PDLCCP 310 allocates and even provisions the necessary resources for different resource managers in advance other than demand-based and also effectively distribute the resources globally considering service and platform High availability (HA) and network latency. For example, allocate three copies of replicated data in different racks and different Availability Zones (AZs) but have both compute and storage closely. At step 812, PDLCCP 310 performs VPC level resource management and planning. At step 814, PDLCCP 310 performs overall resource management and planning. The PDLCCP can predict the overall resource needs in specific types by orchestrating the resource recycling and resource usage trend. The PDLCCP simplifies the overall resource management without depending on the restricted hierarchy dependency. Since each resource pool may be in its own VPC and some resource pools may share a VPC, the PDLCCP may firstly orchestrate within a VPC and then across VPC.

At step 816, unused resource units are collected. PDLCCP 310 can effectively collect the unused resources (such as extra storage from RAM-intensive Spark big data cluster). In one embodiment, PDLCCP 310 is configured to compare the number of resource units currently allocated to a resource proxy 540 with the number of tasks managed by resource proxy 540. If the number of resource units allocated to resource proxy 540 exceeds the number of resource units necessary to execute the number of tasks managed by resource proxy 540, then PDLCCP 310 may release at least some of the resource units allocated to resource proxy 540 to allow those resource units to be allocated to different resource proxies 540.

At step 818, available resource units are allocated to each resource proxy 540 in the plurality of resource proxies 540. Resource proxy 540 sends the allocated resource information to a resource manager.

At step 820 (not shown in FIG. 8), each resource manager can retrieve allocated resource information from a built-in software or a resource proxy. Each resource manager can now focus on its fine-grained resource management or leave it to the PDLCCP but application business logic scheduling and monitoring. Each resource manager or fabric controller in PaaS and IaaS can delegate resource management to the PDLCCP but focus on platform and other business logic.

As a result, PDLCCP 310 has visibility into the overall resource units and resource requirements, and then allocate resource units independently to each layer of the cloud. Thus, the physically distributed, logically central resource allocation scheme may allocate resource units efficiently in the cloud. PDLCCP 310 performs tentative overall planning other than demand-based First come-first served (FCFS). It is easier to uniform two or more different resource managers through PDLCCP 310. And, it is also more efficient for big data processing and data analysis.

Because a built-in software is used in the embodiments, no agent overhead is incurred in deployment, maintenance and etc. In some embodiments, a resource proxy may increase the flexibility for managing a group of resource pools, and may pre-process or filter for a group of resource pools for simplifying or avoiding the overflow of the PDLCCP. Resource HAs are evenly distributed. The embodiments provides resource low latency considering locality, loosely coupled resource dependency, and HA and high reliable PDLCCP.

Figure 9:
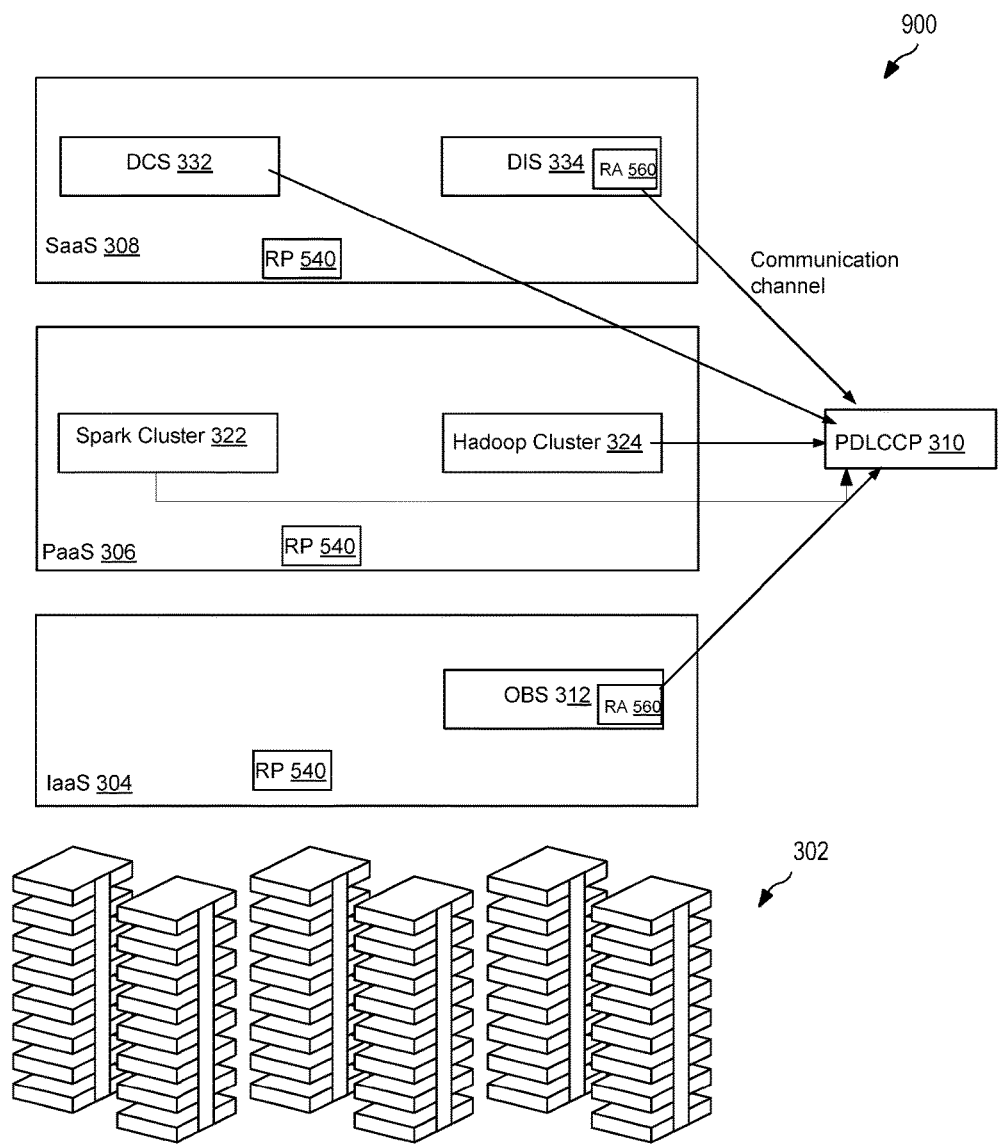
FIG. 9 is a conceptual illustration of a quasi-agentless cloud architecture, in accordance with one embodiment.

FIG. 9 is a conceptual illustration of a quasi-agentless cloud architecture, in accordance with one embodiment. The cloud architecture 900 shown in FIG. 9 differs from the cloud architecture 500 shown in FIG. 5 in that the scheme utilized for resource allocation includes one or more resource agents (RAs) 560. FIG. 9 includes agent cloud resource management (for example DIS 334, and OBS 312), and agentless cloud resource management. Therefore, the cloud architecture shown in FIG. 9 is a quasi-agentless cloud architecture (also called quasi-agentless cloud architecture).

In one embodiment, resource agent 560 (or agent) is a software module configured to manage the resources allocated to that resource agent 560. Resource agent 560 may request resource units from PDLCCP 310. Resource agent 560 can also stream resource profile data to PDLCCP 310. Consequently, resource agent 560 deployed in the cloud is dependent on resource proxy 540 such that PDLCCP 310 can allocate resource units more efficiently within the cloud.

The following reference is related to subject matter of the present application (for example, related to the resource agent), and is incorporated herein by reference in its entirety: application Ser. No. 15/448,444, filed on Mar. 2, 2017, and titled as "UNIFIED RESOURCE MANAGEMENT IN A DATA CENTER CLOUD."

The resource profile data streamed by resource agent 560 includes but is not limited to Time Stamped Data (TSD). Table 2 is an example for the TSD format collected by the resource agent 560.

TABLE 2

| Timestamp | Service | Group | AZ | Resource Type | Resource Value | Resource Unit | Container | Scale Unit | DC | Pod |
|---|---|---|---|---|---|---|---|---|---|---|
| 897893498 | DCS | PaaS1 | AZ1 | CPU | 15 | % | C1 | S1 | DC 1 | P2 |
| 897893499 | DCS | PaaS1 | AZ1 | CPU | 16 | % | C1 | S1 | DC1 | P2 |
| 897893500 | DCS | PaaS1 | AZ1 | CPU | 14 | % | C1 | S1 | DC1 | P2 |
| 897893498 | DPS | PaaS1 | AZ1 | GPU | 80 | % | C2 | S1 | DC1 | P2 |
| 897893499 | DIS | PaaS1 | AZ1 | GPU | 81 | % | C2 | S1 | DC1 | P2 |
| 897893498 | DIS | PaaS1 | AZ1 | IO | 19 | kb/s | C2 | S1 | DC1 | P2 |
| 897893499 | DIS | PaaS1 | AZ1 | IO | 20 | Kb/s | C2 | S1 | DC1 | P2 |
| 897893500 | DCS | PaaS1 | AZ1 | IO | 20 | Kb/s | C1 | S1 | DC1 | P2 |
| 897893498 | DIS | PaaS1 | AZ1 | SSD | 229 | kB | C1 | S1 | DC1 | P2 |
| 897893499 | DIS | PaaS1 | AZ1 | SSD | 230 | kB | C1 | S1 | DC1 | P2 |
| 897893498 | DIS | PaaS1 | AZ1 | RAM | 108 | kB | C1 | S1 | DC1 | P2 |
| 897893499 | DCS | PaaS1 | AZ1 | RAM | 110 | kB | C1 | S1 | DC1 | P2 |
| 897893500 | DCS | PaaS1 | AZ1 | RAM | 116 | kB | C2 | S1 | DC1 | P2 |
| 897893498 | DCS | PaaS1 | AZ1 | DISK | 2008 | kB | C2 | S1 | DC1 | P2 |
| 897893499 | DCS | PaaS1 | AZ1 | DISK | 2009 | kB | C2 | S1 | DC1 | P2 |

Table 2 includes multiple key value pairs. If a service type field is a key in a key value pair, and other field (such as Resource Value, Resource Unit, Container, Pod, Scale Unit, Service, AZ, DC or Group) may be value in the key value pair. From the exemplary Table 2, TSD Format or structure is inconsistent with the agentless data (Table 1). Format inconsistency means a column inconsistency and/or an order inconsistency. In an example of the column consistency, resource agent 560 may collect data related to an availability zone (AZ), or collect data related to a data center (DC). Correspondingly, the Table 2 includes AZ field and DC field to record the data collected by agents. As an example, at Timestamp 897893498, the CPU resource belongs to AZ1 and DC1. For example of the order inconsistency, the fields order in table 2 may be timestamp field, service field, Group field . . . pod field, but the fields order in table 1 may be timestamp field, resource type field, resource value field . . . group field.

Table 3 is another example for the TSD format collected by the resource agent 560.

Resource Value, Resource Unit, Container, Pod, Scale Unit, Service, or Group) may be value in the key value pair. From the exemplary table 3, TSD Format or structure is inconsistent between agent (table 3) and agentless (table 1). Format inconsistency means a row inconsistency in Table 3. The agent system may collect more data for a storage layer, a compute layer, and a network layer. For example, resource agent 560 may collect CPU used data or CPU idle data. Another example, resource agent 560 may collect RAM used data or RAM buffered data. As an example, at Timestamp 897893498, the resource value of used CPU is 15%. The used CPU belongs to container C1, pod P2, and Scale unit S1 in PaaS1 group. The used CPU provides DCS. The resource value of idle CPU is 70%. The idle CPU belongs to container C1, pod P2, and Scale unit S1 in PaaS1 group. The idle CPU provides DCS. The resource value of used RAM is 108 kB. The used RAM belongs to container C1, pod P2, and Scale unit S1 in PaaS1 group. The used RAM provides DIS. The resource value of buffered RAM is 54 kB. The buffered RAM belongs to container C1, pod P2, and Scale unit S1 in PaaS1 group. The buffered RAM provides DIS.

TABLE 3

| Timestamp | Resource Type | Resource Value | Resource Unit | Container | Pod | Scale Unit | Service | Group |
|---|---|---|---|---|---|---|---|---|
| 897893498 | CPU used | 15 | % | C1 | P2 | S1 | DCS | PaaS1 |
| 897893498 | CPU idle | 70 | % | C1 | P2 | S1 | DCS | PaaS1 |
| 897893499 | CPU used | 16 | % | C1 | P2 | S1 | DCS | PaaS1 |
| 897893499 | CPU idle | 70 | % | C1 | P2 | S1 | DCS | PaaS1 |
| 897893500 | CPU used | 14 | % | C1 | P2 | S1 | DCS | PaaS1 |
| 897893500 | CPU idle | 71 | % | C1 | P2 | S1 | DCS | PaaS1 |
| 897893498 | GPU | 80 | % | C2 | P2 | S1 | DPS | PaaS1 |
| 897893499 | GPU | 81 | % | C2 | P2 | S1 | DIS | PaaS1 |
| 897893498 | IO | 19 | kb/s | C2 | P2 | S1 | DIS | PaaS1 |
| 897893499 | IO | 20 | Kb/s | C2 | P2 | S1 | DIS | PaaS1 |
| 897893500 | IO | 20 | Kb/s | C1 | P2 | S1 | DCS | PaaS1 |
| 897893498 | SSD | 229 | kB | C1 | P2 | S1 | DIS | PaaS1 |
| 897893499 | SSD | 230 | kB | C1 | P2 | S1 | DIS | PaaS1 |
| 897893498 | RAM used | 108 | kB | C1 | P2 | S1 | DIS | PaaS1 |
| 897893498 | RAM buffered | 54 | kB | C1 | P2 | S1 | DIS | PaaS1 |
| 897893499 | RAM used | 110 | kB | C1 | P2 | S1 | DCS | PaaS1 |
| 897893499 | RAM buffered | 53 | kB | C1 | P2 | S1 | DCS | PaaS1 |
| 897893500 | RAM used | 116 | kB | C2 | P2 | S1 | DCS | PaaS1 |
| 897893500 | RAM buffered | 50 | kB | C2 | P2 | S1 | DCS | PaaS1 |
| 897893498 | DISK | 2008 | kB | C2 | P2 | S1 | DCS | PaaS1 |
| 897893499 | DISK | 2009 | kB | C2 | P2 | S1 | DCS | PaaS1 |

Table 3 includes multiple key value pairs. If a service type field is a key in a key value pair, and other field (such as Table 4 is another example for the TSD format collected by the resource agent 560. Table 4 combines table 2 and 3, and includes a column inconsistency, a row inconsistency and/or an order inconsistency.

TABLE 4

| Timestamp | Service | Group | AZ | Resource Type | Resource Value | Resource Unit | Container | Scale Unit | DC | Pod |
|---|---|---|---|---|---|---|---|---|---|---|
| 897893498 | DCS | PaaS1 | AZ1 | CPU used | 15 | % | C1 | S1 | DC 1 | P2 |
| 897893498 | DCS | PaaS1 | AZ1 | CPU idle | 70 | % | C1 | S1 | DC 1 | P2 |
| 897893499 | DCS | PaaS1 | AZ1 | CPU used | 16 | % | C1 | S1 | DC1 | P2 |
| 897893499 | DCS | PaaS1 | AZ1 | CPU idle | 70 | % | C1 | S1 | DC1 | P2 |
| 897893500 | DCS | PaaS1 | AZ1 | CPU used | 14 | % | C1 | S1 | DC1 | P2 |
| 897893500 | DCS | PaaS1 | AZ1 | CPU idle | 71 | % | C1 | S1 | DC1 | P2 |
| 897893498 | DIS | PaaS1 | AZ1 | GPU | 80 | % | C2 | S1 | DC1 | P2 |
| 897893499 | DIS | PaaS1 | AZ1 | GPU | 81 | % | C2 | S1 | DC1 | P2 |
| 897893498 | DIS | PaaS1 | AZ1 | IO | 19 | kb/s | C2 | S1 | DC1 | P2 |
| 897893499 | DIS | PaaS1 | AZ1 | IO | 20 | Kb/s | C2 | S1 | DC1 | P2 |
| 897893500 | DCS | PaaS1 | AZ1 | IO | 20 | Kb/s | C1 | S1 | DC1 | P2 |
| 897893498 | DIS | PaaS1 | AZ1 | SSD | 229 | kB | C1 | S1 | DC1 | P2 |
| 897893499 | DIS | PaaS1 | AZ1 | SSD | 230 | kB | C1 | S1 | DC1 | P2 |
| 897893498 | DIS | PaaS1 | AZ1 | RAM used | 108 | kB | C1 | S1 | DC1 | P2 |
| 897893498 | DIS | PaaS1 | AZ1 | RAM buffered | 54 | kB | C1 | S1 | DC1 | P2 |
| 897893499 | DCS | PaaS1 | AZ1 | RAM used | 110 | kB | C1 | S1 | DC1 | P2 |
| 897893499 | DCS | PaaS1 | AZ1 | RAM buffered | 53 | kB | C1 | S1 | DC1 | P2 |
| 897893500 | DCS | PaaS1 | AZ1 | RAM used | 116 | kB | C2 | S1 | DC1 | P2 |
| 897893500 | DCS | PaaS1 | AZ1 | RAM buffered | 50 | kB | C2 | S1 | DC1 | P2 |
| 897893498 | DCS | PaaS1 | AZ1 | DISK | 2008 | kB | C2 | S1 | DC1 | P2 |
| 897893499 | DCS | PaaS1 | AZ1 | DISK | 2009 | kB | C2 | S1 | DC1 | P2 |

Table 5 is another example for the TSD format collected by the resource agent 560. Table 5 is different from tables 1-4. For example, table 5 includes performance metric field.

TABLE 5

| Timestamp | Job ID | Service | Completion time | Average CPU utilization | Average Web response time |
|---|---|---|---|---|---|
| 897893498 | Job x | DCS | 15 s | 15% | |
| 897893499 | Job y | DIS | 14 s | 16% | |
| 897893499 | Job z | Web server | | 5% | 1.2 s |

Table 5 includes multiple key value pairs. Job ID is a key in a key value pair to indicate a performance metric, and other field (such as service, completion time, average CPU utilization, or Average Web response time) is a value in the key value pair to indicate a value of the performance metric. For example, at Timestamp 897893498, job x (key) provides DCS (value). A completion time of job x (value) is 15 s, and the average CPU utilization of job x (value) is 15%. At Timestamp 897893499, job y (key) provides DIS (value). A completion time of job y (value) is 14 s, and the average CPU utilization of job y (value) is 16%. At Timestamp 897893499, job z (key) provides a web server service (value). The average CPU utilization of job z (value) is 5%, and average Web response time of job z (value) is 1.2 s.

Tables 2-5 are examples to explain the data collected by agents. More or less fields are possible for the TSD collected by the resource agent 560.

Figure 10:
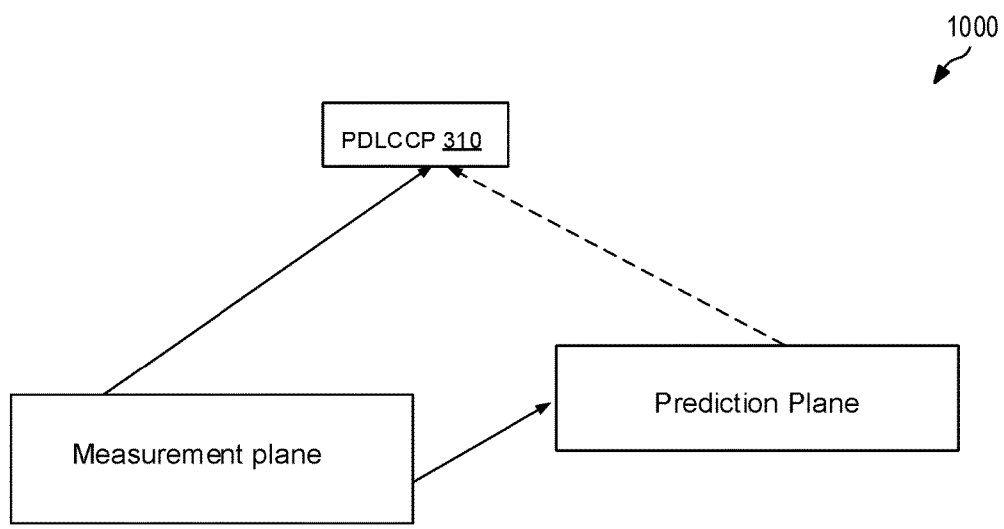
FIG. 10 illustrates PDLCCP 310 obtains resource profile not only from measurement plane, but also from prediction plane in the quasi-agentless cloud architecture.

FIG. 10 illustrates embodiments where PDLCCP 310 obtains (or collects) resource profile not only from the measurement plane, but also from the prediction plane in the quasi-agentless cloud architecture. Measurement plane means measuring time stamped data (TSD) directly. The prediction plane predicts TSD based on data collected by the measurement plane. The cloud architecture can predict resource type and/or resource parameters based on the TSD provided by the measurement plane. The cloud architecture can also predict resource value provided by a resource type. In some embodiments, PDLCCP 310 collects TSD from measurement plane, and then PDLCCP 310 performs prediction to obtain data for the prediction plane.

Figure 11:
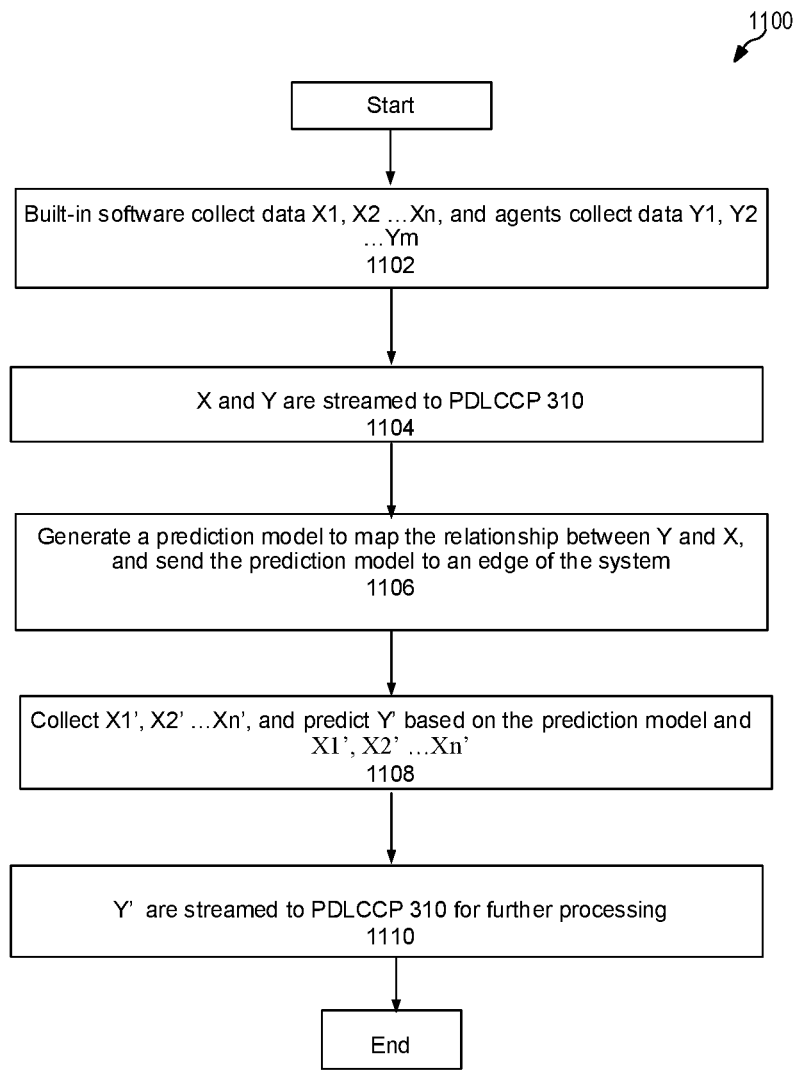
FIG. 11 is a flowchart of a method for resource prediction, in accordance with one embodiment.

FIG. 11 illustrates a flowchart of a method 1100 for resource prediction, in accordance with one embodiment. The cloud architecture system may utilize learning algorithms to predict a resource type and/or service the cloud may need to operate at a certain time in the future based on Time Stamped Data collected over the measurement plane.

At step 1102, in the quasi-agentless cloud architecture, for example, 100 agents are installed in the system, and others are agentless. In clusters having agents (such as clusters with 100 agents installed), built-in software collect TSD X1, X2 ... Xn, where n is an integer. The 100 agents deployed in the cloud, collect data Y2, Y2 ... Ym, wherein m is an integer. Data X1, X2 ... Xn, and Y1, Y2 ... Ym belong to the measurement plane shown in FIG. 10. For example, X1, X2 ... Xn may be data from table 1, and Y1, Y2 ... Ym may be data from tables 2-5.

At step 1104, TSD X1, X2 ... Xn and TSD Y1, Y2 ... Ym are streamed to PDLCCP 310. PDLCCP 310 collets TSD X1, X2 ... Xn from built-in software, and collets Y1, Y2 ... Ym from agents.

At step 1106, PDLCCP may generate (or select) a prediction model F to map the relationship between Y and X as Y=F(X), and send the prediction model to an edge of the system (such as, a resource manager or a fabric controller in the cloud architecture). For example, the prediction model may be based on one or more machine learning schemes, such as, but not limited to, decision tree learning, graphical models (e.g., a probabilistic graphical model), linear regression models, logistic regression models, or any other suitable model. The modeling scheme(s) selected may vary depending for example, on the number of variables involved (e.g., different types of resource such as network resources, I/O resources, etc.). In one embodiment, the prediction model may include a linear regression algorithm expressed as follows:

$$Y=F(X)=a1X1+a2X2+ \ldots +anXn, \quad (1)$$

where Y denotes data collected by the agents deployed in the cloud, such as Y1, Y2, . . . Ym, and X denotes data collected by built-in software, such as X1, X2 . . . Xn, and a1, a2, . . . , an denote the weights derived by the training phase of the linear regression algorithm After selecting a prediction model such as based on equation (1) above, PDLCCP may train the prediction model using time stamped data gathered over a certain duration as training data to get the function F. For example, the system may employ one or more machine learning techniques to improve the prediction model's interpretability, shorten training times, maximize mean accuracy rate, minimize noise, etc.

In one embodiment, the system may train one or more models based on the metrics data. Each model in the one or more models implements a machine learning algorithm. Machine learning algorithms include, but are not limited to, e.g., classification algorithms, regression algorithms, or clustering algorithms. Classification algorithms include, e.g., a decision tree algorithm, a support vector machine (SVM) algorithm, a neural network, and a random forest algorithm, and the like. Regression algorithms include, e.g., a linear regression algorithm, ordinary least squares regression algorithms, and the like. Clustering algorithms include, e.g., a K-means algorithm, a hierarchical clustering algorithm, and a highly connected subgraphs (HCS) algorithm, and the like. Each machine learning algorithm may be associated with a number of parameters that can be set to configure the model. In some embodiments, the training data is grouped first into separate groups which are manually defined, or automatically clustered. A machine learning model can be trained separately for each group of training data. For example, the system may train a prediction model 1 for service DCS, and a prediction model 2 for service DIS. The system may train a prediction model 3 for Spark cluster, and a prediction model 4 for Hadoop cluster.

After PDLCCP generates the prediction model F to map the relationship between Y and X as Y=F(X), PDLCCP may send the prediction model to the edge of the system. For example, PDLCCP may send the prediction model to a cluster without agent in the system.

At step 1108, the agentless cluster collects TSD X1', X2' . . . Xn'. According to the function F, the agentless cluster (for example, resource manager or fabric controller in the agentless cluster) may predict Y' based on equation (2)

$$Y'=F(X'), \quad (2)$$

where X' denotes data collected by built-in software in the agentless cluster, such as TSD X1', X2' . . . Xn', F is the function obtained from equation (1). For example, X1', X2' . . . Xn' may be data from table 1. Y' denotes data predicted for built-in software, such as Y1', Y2' . . . Yn'. Y' are not real data collected by agents, instead that Y' are predicted data obtained from equation (2) for built-in software. Data Y1', Y2' . . . Yn' belong to the prediction plane shown in FIG. 10. In clusters having built-in software but without agents, X' are collected. Based on equation (2), Y' are predicted for the clusters without agents. Through the prediction at step 1108, format inconsistency between data collected by agent (for example, tables 2-5) and built-in software (for example, table 1) is removed or reduced. Fields in Y includes fields in Y'. That means fields in Y' are equal to or smaller than fields in Y. For example, if Y includes a first key value pair, Y' includes a second key value pair, a structure of the first key value pair is the same as the structure of a second key value pair.

For an example, the system will predict a new TSD at a fine-grained timestamp or different timestamp. If TSD X represents a first TSD, Y represents a second TSD, X' represents a third TSD, and Y' represents a fourth TSD, the fourth TSD may include performance metric (key), and a value of the performance metric (value). For example, if the structure of Y is as Table 5, Y' includes similar structure as Table 5. If job x is the key in Y', and completion time is the value in fourth TSD. If Job y is the key in Y', and used CPU is the value in the fourth TSD. If Job Z is the key in Y', and web response time to a request is the value in the fourth TSD.

For another example, built-in software collects TSD at timestamp 897893510. The resource type field of the TSD is a CPU, and the CPU provides DIS. The system will predict column field (for example, AZ field or DC field) for the CPU at timestamp 897893510 based on equation (2).

For other example, built-in software collects TSD at timestamp 897893510. The resource type field of the TSD is a CPU, and the CPU provides DIS. The system will predict row field (for example, CPU idle field) for the CPU at timestamp 897893510 based on equation (2). The system may predict row field (for example, CPU idle field) for the CPU at a fine-grained timestamp, for example row field at timestamp 897893498.

At step 1110, data Y' are streamed to PDLCCP 310 for further processing. It is optional to stream data X' to PDLCCP 310 for further processing. PDLCCP 310 will pre-process the streamed data, and do other processing similar to FIGS. 4, 6 and 8. PDLCCP 310 may allocate unused resource units based on the prediction results.

Figure 12:
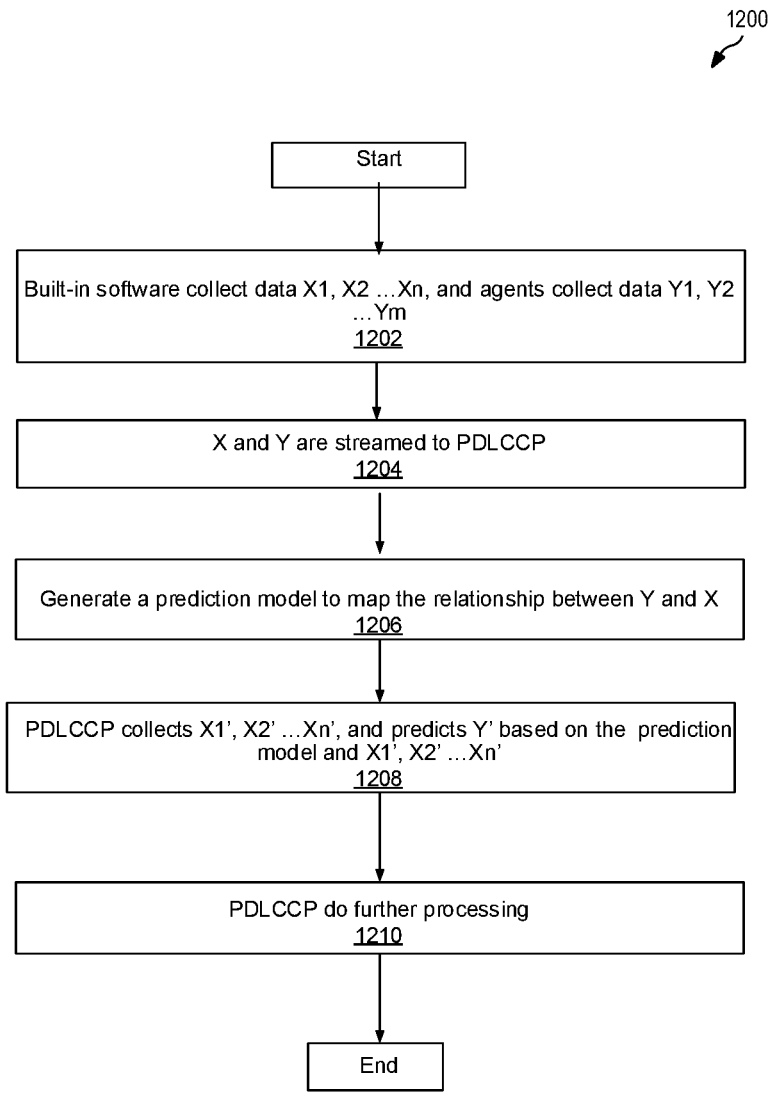
FIG. 12 is a flowchart of a method for resource prediction, in accordance with one embodiment.

FIG. 12 is a flowchart of a method 1200 for resource prediction, in accordance with one embodiment. The method shown in FIG. 12 differs from the method 1100 shown in FIG. 1100 in that PDLCCP performs prediction after PDLCCP collects data from built-in software and agents.

Steps 1202-1206 in FIG. 12 are similar as steps 1102-1106 in FIG. 11. At step 1208, the agentless cluster collects TSD X1', X2' . . . Xn', and streams TSD X1', X2' . . . Xn' to PDLCCP. PDLCCP collects X1', X2' . . . Xn'. According to the function F, PDLCCP may predict Y' based on equation (2). At step 1210, PDLCCP 310 will pre-process the collected X' from measurement plane and the predicated data Y' from step 1208, and do other processing similar to FIGS. 4, 6, 8 and 11.

In some embodiments, the edge of the system (such as, resource manager or fabric controller in the system) may generate a prediction model F to map the relationship between Y and X as Y=F(X).

With the prediction in the quasi-agentless cloud architecture, it is more efficient for big data processing and data analysis. Moreover, more data are obtained via the prediction, resource management is more efficient and accurate. Unused resource units are evenly distributed based on the prediction results. Thus, the physically distributed, logically central resource allocation scheme may manage resource units efficiently in the cloud.

Figure 13:
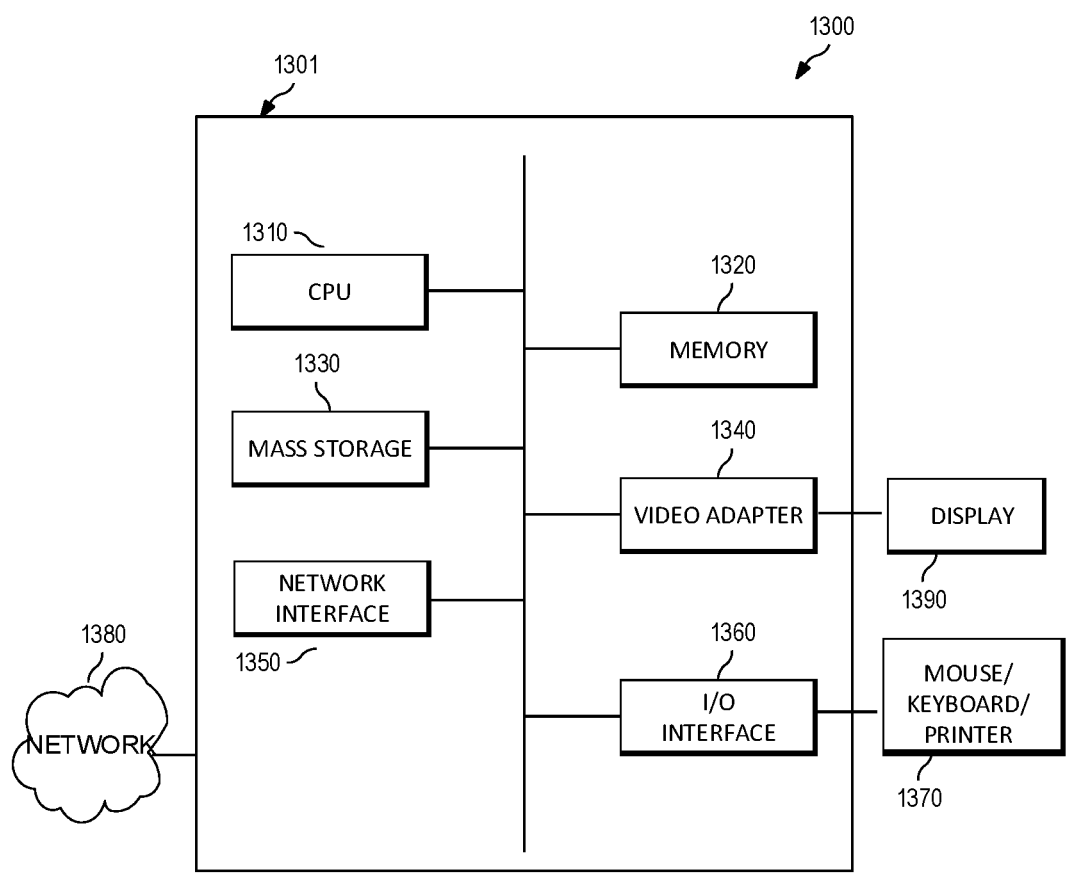
FIG. 13 illustrates an exemplary system in which the various architecture and/or functionality of the various previous embodiments may be implemented.

FIG. 13 illustrates an exemplary system 1300 in which the various architecture and/or functionality of the various previous embodiments may be implemented.

FIG. 13 is a block diagram of a processing system 1300 that can be used to implement various embodiments. The processing system 1300 can be part of a server, computer, network controller, or other network device. Additionally, the processing system can host one or more of the described elements. For example, a physically distributed, but logically centralized cloud plane (PDLCCP) 310, resource proxy 540, and access control service 720 may be deployed on a same processing system 1300, or a physically distributed, but logically centralized cloud plane (PDLCCP) 310, resource proxy 540, and access control service 720 may be on separate processing systems 1300 or each may be spread across multiple processing systems 1300. Specific devices utilize all of the components shown, or only a subset of the components, and levels of integration will vary from device to device. Furthermore, a device may contain multiple instances of a component, such as multiple processing units, processors, memories, transmitters, receivers, etc. In some embodiments, the processing system 1300 has a processing unit 1301 equipped with one or more input/output devices, such as a speaker, microphone, mouse, touchscreen, keypad, keyboard, printer, display, and the like. The processing unit 1301 may include a central processing unit (CPU) 1310, a memory 1320, a mass storage device 1330, a video adapter 1340, and an I/O interface 1360 connected to a bus. The bus is one or more of any type of several bus architectures including a memory bus or memory controller, a peripheral bus, a video bus, or the like.

The CPU 1310 may have any type of electronic data processor. The memory 1320 may have, or be, any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 includes any type of storage device that stores data, programs, and other information and to make the data, programs, and other information accessible via the bus. The mass storage device 1330 includes, for example, one or more of a solid state drive, hard disk drive, a magnetic disk drive, an optical disk drive, or the like.

The video adapter 1340 and the I/O interface 1360 provide interfaces to couple external input and output devices to the processing unit. As illustrated, examples of input and output devices include a display 1390 coupled to the video adapter 1340 and any combination of mouse/keyboard/printer 1370 coupled to the I/O interface 1360. Other devices may be coupled to the processing unit 1301, and additional or fewer interface cards may be utilized. For example, a serial interface card (not shown) may be used to provide a serial interface for a printer.

The processing unit 1301 also includes one or more network interfaces 1350, which includes wired links, such as an Ethernet cable or the like, and/or wireless links to access nodes or one or more networks 1380. The network interface 1350 allows the processing unit 1301 to communicate with remote units via the networks 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like.

The architecture and/or functionality of the various previous figures may be implemented in the context of a general computer system, a circuit board system, a game console system dedicated for entertainment purposes, an application-specific system, and/or any other desired system. For example, the system 1300 may take the form of a desktop computer, laptop computer, server, workstation, game consoles, embedded system, and/or any other type of logic. Still yet, the system 1300 may take the form of various other devices including, but not limited to a personal digital assistant (PDA) device, a mobile phone device, a television, etc.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable medium are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for a resource management in a cloud architecture, comprising:
    collecting a first time stamped data (TSD), wherein the first TSD includes a first timestamp, a first field and a second field, wherein the first field indicates a resource type of a first resource unit at the first timestamp, and the second field indicates a utilization of the first resource unit at the first timestamp;
    collecting a second TSD with an agent, wherein the second TSD includes the first timestamp and a first key value pair;
    generating a prediction model based on the first TSD and the second TSD;
    collecting a third TSD, wherein the third TSD includes a second timestamp, a third field and a fourth field, wherein the third field indicates a resource type of a second resource unit at the second timestamp, and the fourth field indicates a utilization of the second resource unit at the second timestamp; and
    predicting a fourth TSD based on the prediction model and the third TSD, wherein the fourth TSD includes the second timestamp and a second key value pair.

2. The method of claim 1, wherein the first key value pair includes a key indicating a performance metric, and a value of the performance metric at the second timestamp.

3. The method of claim 1, wherein a structure of the first key value pair is the same as a structure of the second key value pair.

4. The method of claim 1, wherein the predicting is performed by a physically distributed but logically centralized cloud plane (PDLCCP), and the method further comprises:
    receiving, by the PDLCCP, the first TSD from a first built-in software;
    receiving, by the PDLCCP, the second TSD from the agent; and
    receiving, by the PDLCCP, the third TSD from a second built-in software.

5. The method of claim 1, wherein the predicting is performed by a controller in the cloud architecture, and the method further comprises:
    sending, by a PDLCCP, the prediction model to the controller, wherein the controller comprises a resource manager or a fabric controller in the cloud architecture.

6. The method of claim 5, wherein the method further comprises:
    sending, by the controller, the fourth TSD to the PDLCCP.

7. The method of claim 1, wherein the first TSD further comprises a container field, a pod field, and a scale unit (SU) field, wherein the container field indicates a container the first resource unit belongs to, the pod field indicates a pod the first resource unit belongs to, and the SU field indicates a SU the first resource unit belongs to.

8. The method of claim 1, wherein the first TSD is sent to a PDLCCP, via a resource proxy.

9. The method of claim 8, wherein the first TSD sent to the PDLCCP are encrypted TSD.

10. A system for a resource management in a cloud architecture, comprising:
    a non-transitory memory storage comprising instructions; and one or more processors in communication with the memory, wherein the one or more processors execute the instructions to:

collect a first time stamped data (TSD), wherein the first TSD includes a first timestamp, a first field and a second field, wherein the first field indicates a resource type of a first resource unit at the first timestamp, and the second field indicates a utilization of the first resource unit at the first timestamp;

collect a second TSD with an agent, wherein the second TSD includes the first timestamp, and a first key value pair;

generate a prediction model based on the first TSD and the second TSD;

collect a third TSD, wherein the third TSD includes a second timestamp, a third field and a fourth field, wherein the third field indicates a resource type of a second resource unit at the second timestamp, and the fourth field indicates a utilization of the second resource unit at the second timestamp; and predict a fourth TSD based on the prediction model and the third TSD, wherein the fourth TSD includes the second timestamp and a second key value pair.

11. The system of claim 10, wherein the first key value pair includes a key indicating a performance metric and a value of the performance metric at the second timestamp.

12. The system of claim 10, wherein a structure of the first key value pair is the same as a structure of the second key value pair.

13. The system of claim 10, wherein the one or more processors execute the instructions to:
receive the first TSD from a first built-in software;
receive the second TSD from the agent; and
receive the third TSD from a second built-in software.

14. The system of claim 10, wherein the one or more processors execute the instructions to:
send the prediction model to a controller, wherein the controller comprises a resource manager or a fabric controller in the cloud architecture.

15. The system of claim 10, wherein the first TSD further comprises a container field, a pod field, and a scale unit (SU) field, wherein the container field indicates a container the first resource unit belongs to, the pod field indicates a pod the first resource unit belongs to, and the SU field indicates a SU the first resource unit belongs to.

16. A non-transitory computer-readable medium storing computer instructions for a resource management in a cloud architecture, when executed by one or more processors, cause the one or more processors to perform the steps of:

collecting a first time stamped data (TSD), wherein the first TSD includes a first timestamp, a first field and a second field, wherein the first field indicates a resource type of a first resource unit at the first timestamp, and the second field indicates a utilization of the first resource unit at the first timestamp;

collecting a second TSD with an agent, wherein the second TSD includes the first timestamp and a first key value pair;

generating a prediction model based on the first TSD and the second TSD;

collecting a third TSD, wherein the third TSD includes a second timestamp, a third field and a fourth field, wherein the third field indicates a resource type of a second resource unit at the second timestamp, and the fourth field indicates a utilization of the second resource unit at the second timestamp; and predicting a fourth TSD based on the prediction model and the third TSD, wherein the fourth TSD includes the second timestamp and a second key value pair.

17. The non-transitory computer-readable medium of claim 16, wherein the first key value pair includes a key indicating a performance metric and a value of the performance metric at the second timestamp.

18. The non-transitory computer-readable medium of claim 16, wherein a structure of the first key value pair is the same as a structure of the second key value pair.

19. The non-transitory computer-readable medium of claim 16, wherein the computer instructions when executed by one or more processors, cause the one or more processors to perform the steps of:
receiving the first TSD from a first built-in software;
receiving the second TSD from the agent; and
receiving the third TSD from a second built-in software.

20. The non-transitory computer-readable medium of claim 16, wherein the computer instructions when executed by one or more processors, cause the one or more processors to perform the steps of:
sending the prediction model to a controller, wherein the controller comprises a resource manager or a fabric controller in the cloud architecture.

* * * * *